(12) United States Patent
Cleve et al.

(10) Patent No.: US 7,113,967 B2
(45) Date of Patent: Sep. 26, 2006

(54) EFFICIENT QUANTUM COMPUTING OPERATIONS

(75) Inventors: Richard Cleve, Calgary (CA); John Watrous, Calgary (CA)

(73) Assignee: MagiQ Technologies, Inc, New York, NY (US)

(*) Notice: Subject to any disclaimer, the term of this patent is extended or adjusted under 35 U.S.C. 154(b) by 400 days.

(21) Appl. No.: 10/156,503

(22) Filed: May 29, 2002

(65) Prior Publication Data

US 2003/0005010 A1    Jan. 2, 2003

Related U.S. Application Data

(60) Provisional application No. 60/294,089, filed on May 29, 2001.

(51) Int. Cl.
*G06F 15/00* (2006.01)
*H01L 29/06* (2006.01)

(52) U.S. Cl. .......................... 708/403; 257/14

(58) Field of Classification Search ......... 708/400–403
See application file for complete search history.

(56) References Cited

U.S. PATENT DOCUMENTS

| | | |
|---|---|---|
| 4,419,579 A | 12/1983 | East |
| 4,476,384 A | 10/1984 | Westphal |
| 4,648,133 A | 3/1987 | Vilnrotter |
| 4,833,633 A | 5/1989 | Morris |
| 4,843,328 A | 6/1989 | Greenhall |
| 5,243,649 A | 9/1993 | Franson |
| 5,307,410 A | 4/1994 | Bennett |
| 5,339,182 A | 8/1994 | Kimble et al. |
| 5,418,905 A | 5/1995 | Rarity et al. |
| 5,515,438 A | 5/1996 | Bennett et al. |
| 5,568,301 A | 10/1996 | Tiemann et al. |
| 5,570,222 A | 10/1996 | Chovan |
| 5,675,648 A | 10/1997 | Townsend |
| 5,732,139 A | 3/1998 | Lo et al. |
| 5,757,912 A | 5/1998 | Blow |
| 5,764,765 A | 6/1998 | Phoenix et al. |
| 5,768,297 A | 6/1998 | Shor |
| 5,768,378 A | 6/1998 | Townsend et al. |
| 5,850,441 A | 12/1998 | Townsend et al. |
| 5,953,421 A | 9/1999 | Townsend |
| 5,987,483 A | 11/1999 | Edelkind et al. |

(Continued)

FOREIGN PATENT DOCUMENTS

WO    WO 96/06491    2/1996

(Continued)

OTHER PUBLICATIONS

Cleve et al., Fast Parallel circuits for the quantum Fourier Transform, 2000, IEEE, pp. 526-536.*

(Continued)

*Primary Examiner*—Kakali Chaki
*Assistant Examiner*—Chat C. Do
(74) *Attorney, Agent, or Firm*—Opticus IP Law PLLC

(57) ABSTRACT

A method of performing a quantum Fourier transform in a quantum computing circuit is disclosed. The method includes forming a quantum computing circuit as a collection of two-qubit gates operating on a sequence of input qubits. Auxiliary qubits are then interacted with the original input qubits to place the auxiliary qubits in a state corresponding to an output of a discrete Fourier transform of a classical state of the input qubits. The original input qubits are then re-set to their ground state by physically interacting the input qubits with the auxiliary qubits. The auxiliary qubits are then transformed to a state representative of a quantum Fourier transform of the sequence of input qubits.

6 Claims, 6 Drawing Sheets

U.S. PATENT DOCUMENTS

| | | | |
|---|---|---|---|
| 5,999,285 | A | 12/1999 | Brandt et al. |
| 6,076,097 | A | 6/2000 | London et al. |
| 6,128,764 | A | 10/2000 | Gottesman |
| 6,188,768 | B1 | 2/2001 | Bethune et al. |
| 6,218,657 | B1 | 4/2001 | Bethune et al. |
| 6,272,224 | B1 | 8/2001 | Mazourenko et al. |
| 6,289,104 | B1 | 9/2001 | Patterson et al. |
| 6,301,029 | B1* | 10/2001 | Azuma ........................ 359/108 |
| 6,314,189 | B1 | 11/2001 | Motoyoshi et al. |
| 6,360,183 | B1 | 3/2002 | Shilton |
| 6,393,448 | B1 | 5/2002 | Dultz et al. |
| 6,438,234 | B1 | 8/2002 | Gisin et al. |
| 2001/0055389 | A1 | 12/2001 | Hughes et al. |
| 2002/0025041 | A1 | 2/2002 | Tomita |

FOREIGN PATENT DOCUMENTS

| | | |
|---|---|---|
| WO | WO 97/44936 | 11/1997 |
| WO | WO 98/10560 | 3/1998 |

OTHER PUBLICATIONS

John Watrous, Quantum simulations of classical random walks and undirected graph connectivity, 1999, IEEE, pp. 180-187.*
John Watrous, Relationships between quantum and classical space-bounded complexity classes, 1998, IEEE, pp. 210-227.*
Nader et al., Size-Depth tradeoffs for algebraic formulae, 1991, IEEE, pp. 334-341.*
U.S. Appl. No. 60/025,839, filed Sep. 5, 1996, Gisin et al.
Townsend, "Quantum cryptography on official fiber networks," Optical Fiber Technology (1998).
Gottesman et al., "From Quantum Cheating to Quantum Security," Physics Today Online, Nov. 2000, www.physicstoday.org/pt/vol-53/iss-11/p22.html pp. 1-11.
Stucki et al., "Quantum Key Distribution over 67 km with a Plug&Play System," Mar. 22, 2002, http://xxx.lanl.gov/PS_cache/quant-ph/pdf/0203/0203118.pdf pp. 1-7.
Buttler et al., "New, Efficient and Robust, Fiber-based Quantum Key Distribution Key Disribution Schemes," Mar. 20, 2002, http://xxx.lanl.gov/PS_cache/quant-ph/pdf/0203/0203098.pdf pp. 1-4.
Gisin et al., "Quantum Cryptography," Sep. 18, 2001, http://xxx.lanl.gov/PS_cache/quant-ph/pdf/0101/0101098.pdf pp. 1-57.
Kempe et al., "Theory of Decoherance-Free Fault-tolerant Universal Quantum Computation," Apr. 19, 2000, http://xxx.lanl.gov/PS_cache/quant-ph/pdf/0004/0004064.pdf pp. 1-40.
Bennett et al., "Experimental Quantum Cryptography," J. Cryptology, vol. 5, pp. 3-28, 1992.
Brassard et al., "Secret Key Reconciliation by Public Discussion, Advances in Cryptology," Eurocrypt' 93 Proceedings, pp. 410-423, 1993.
Sugimoto et al., "A study on Secret Key Reconciliation Protocol Cascade," IEICE Trans. Fundamentals E83-A, pp. 1987-1991, Jan. 2000.
Bennett et al., "Generalized Privacy Amplification," IEEE Trans. on Information Theory, vol. 41, No. 6, pp. 1915-1923, Nov. 1995.
Maurer, "Secret Key Agreement by Public Discussion from Common Information," IEEE Trans. Inf. Theory vol. 39, No. 3, 733-742, May 1993.
Maurer et al., "Unconditionally Secure Key Agreement and the Intrinsic Conditional Information," IEEE Trans. Inf. Theory vol. 45, No. 2, 499-514, Mar. 1999.
Shor et al., "Simple proof of security of the BB84 quantum key distribution protocol," Phys. Rev. Lett. vol. 85, No. 2, pp. 441-444, Jul. 2000.
Mayers, "Unconditional security in quantum cryptography," Journal of the ACM, vol. 48, No. 3, pp. 351-406, May 2001.
Bennett et al., "Quantum cryptography: Public key distribution and coin tossing," Proceedings of IEEE International Conference on Computers, Systems, and Signal Processing, IEEE, pp. 175-179, Dec. 1984.
Ekert, "Quantum cryptography based on Bell's Theorem," Phys. Rev. Lett. vol. 67, pp. 661-663, Aug. 1991.

Bennett et al., "Mixed-state entanglement and quantum error correction," Phys. Rev. A, vol. 54, No. 5, pp. 3824-3851, Nov. 1996.
Bennett et al., "Purification of Noisy Entanglement and Faithful Teleportation via Noisy Channels," Phys. Rev. Lett., vol. 76, No. 5, pp. 722-725, Jan. 1991.
Deutsch et al., "Quantum Privacy Amplification and the Security of Quantum Cryptography over Noisy Channels," Phys. Rev. Lett. 77, 2818-2821, Sep. 1996; 80, No. 9, 2022, Mar. 1998 errata.
Mayers, preprint of, "Unconditional Security in Quantum Cryptography," Sep. 15, 1998, http://xxx.lanl.gov/PS_cache/quant-ph/pdf/9802/9802025.pdf pp. 1-18.
Lo et al., "Unconditional security of quantum key distribution over arbitrarily long distances," Science, vol. 283, (1999), pp. 2050-2056; also available at http://xxx.lanl.gov/PS_cache/quant-ph/pdf/9803/9803006.pdf pp. 1-21.
Biham et al., "A proof of security of quantum key distribution," Dec. 11, 1999, http://aps.arxiv.org/PS_cache/quant-ph/pdf/9912/9912053.pdf 31 pages.
Inamori et al., "Unconditional Security of Practical Quantum Key Distribution," Jul. 3, 2001 http://xxx.lanl.gov/PS_cache/quant-ph/pdf/0107/0107017.pdf pp. 1-47.
Gottesman et al., "Proof of security of quantum key distribution with two-way classical communications," May 23, 2001, http://xxx.lanl.gov/PS_cache/quant-ph/pdf/0105/0105121.pdf pp. 1-17.
Lo, "Proof of unconditional security of six-state quantum key distribution scheme," Quantum Information and Computation, vol. 1, No. 2, pp. 81-94, 2001.
Bennett et al., "Generalized Privacy Amplification," IEEE Transactions on Information Theory, vol. 41, No. 6, pp. 1915-1923, Nov. 1995).
Bruss, "Optimal eavesdropping in quantum cryptography with six states," Phys. Rev. Lett., vol. 81, No. 14, pp. 3018-3021, Oct. 1998.
Lo et al., "Efficient quantum key distribution scheme and proof of its unconditional security," Nov. 30, 2001, http://xxx.lanl.gov/PS_cache/quant-ph/pdf/0011/0011056.pdf pp. 1-32.
Gottesman et al., "Secure quantum key distribution using squeezed states," Sep. 25, 2000, http://xxx.lanl.gov/PS_cache/quant-ph/pdf/0008/0008046.pdf pp. 1-19.
Calderbank et al., "Good Quantum error-correcting codes exist," Apr. 16, 1996, http://aps.arxiv.org/PS_cache/quant-ph/pdf/9512/9512032.pdf pp. 1-24.
Steane, "Multiple particle interference and quantum error correction," May 13, 1996, http://aps.arxiv.org/PS_cache/quant-ph/pdf/9601/9601029.pdf pp. 1-45.
Fuchs et al., "Optimal eavesdropping in quantum crytography. I," Jan. 30, 1997, http://aps.arxiv.org/PS_cache/quant-ph/pdf/97010/9701039.pdf 29 pages.
Cirac et al., "Coherent eavesdropping strategies for the 4 state quantum crytography protocol," Jan. 31, 1997, http://aps.arxiv.org/PS_cache/quant-ph/pdf/97020/9702002.pdf pp. 1-6.
Bennett et al., "Quantum Cryptography," Scientific American, pp. 50-57, Oct. 1992.
Bennett, "Quantum Cryptography Using Any Two Nonorthogonal States," Phys Rev Lett vol. 68, No. 21, pp. 3121-3124, May 1992.
Santori et al., "Triggered Single Photons from a Quantum Dot," Phys Rev Lett vol. 86, No. 8, pp. 1502-1505, Feb. 2001.
Townsend et al., "Enhanced Single Photon Fringe Visibility in a 10 km-Long Prototype Quantum Cyrptography Channel," Electronics Letters vol. 29, No. 14, pp. 1291-1293, Jul. 1993.
Townsend, "Experimental Investigation of the Performance Limits for First Telecommunications-Window Quantum Cryptography Systems," IEEE Photonics Technology Letters vol. 10, No. 7, pp. 1048-1050, Jul. 1998.
Tittel et al., "Quantum Cryptography", Physics World vol. 3, pp. 41-45, Mar. 1998.
Chiangga et al., "Towards practical quantum cryptography," Appl Phys B 69, pp. 389-393, 1999.
Blow et al., "Continuum fields in quantum optics," Phys Rev A vol. 42, No. 7, pp. 4102-4114, Oct. 1990.
Braunstein et al., "Scalable quantum computers, paving the way to realization," Wiley-VCH, 2001, Abstract, see http://www.wiley-vch.de/books/tis/eng/3-527-40321-3.html pp. 1-3.

Shor, "Algorithms for Quantum Computation: DIscrete Log and Factoring," Extended Abstract, pp. 1-14, 1994.
Grover, "Quantum Mechanics Helps in Searching for a Needle in a Haystack," Jul. 17, 1997 http://xxx.lanl.gov/PS_cache/quant-ph/pdf/9706/9706033.pdf.
Bennett et al., "Teleporting an Unknown Quantum State via Dual Classical and Einstein-Podolsky-Rosen Channels," Phys. Rev. Lett. vol. 70, No. 13, pp. 1895-1899, Mar. 1993.
Bennett et al., "Quantum Information Theory," IEEE Trans. Info. Theory vol. 44, No. 6, pp. 2724-2742, Oct. 1998.
Shor, "Scheme for reducing decoherence in quantum computer memory," Phys. Rev. A vol. 52, No. 4, pp. 2493-2496, Oct. 1995.
Steane, "Error Correcting Codes in Quantum Theory," Phys. Rev. Lett. vol. 77, No. 5, pp. 793-797, Jul. 1996.
Knill et al., "Theory of quantum error-correcting codes," Phys. Rev. A vol. 55, No. 2, pp. 900-911, Feb. 1997.
D. Gottesman, "A Class of Quantum Error-Correcting Codes Saturating the Quantum Hamming Bond," Jul. 24, 1996, http://xxx.lanl.gov/PS_cache/quant-ph/pdf/9604/9604038.pdf pp. 1-22.
Aharonov et al., "Fault-Tolerant Quantum Computation with Constant Error,"Nov. 15, 1996, http://xxx.lanl.gov/PS_cache/quant-ph/pdf/9611/9611025.pdf pp. 1-18.
Knill et al., "Resilient Quantum Computation," Science vol. 279, pp. 342-345, Jan. 1998.
Preskill, "Reliable quantum computers," Proc. R. Soc. Lond. A, vol. 454, pp. 385-410, 1998.
Palma et al., "Quantum Computers and Dissipation," Jan. 31, 1997, http://aps.arxiv.org/PS_cache/quant-ph/pdf/97020/9702001.pdf pp. 1-31.
Duan et al., "Preserving Coherence in Quantum Computation by Pairing the Quantum Bits," Oct. 3, 1997, http://aps.arxiv.org/PS_cache/quant-ph/pdf/97030/9703040.pdf pp. 1-13.
Duan et al., "Reducing decoherence in quantum-computer memory with all quantum bits coupling to the same environment," Phys. Rev. A vol. 57, No. 2, pp. 737-741, Feb. 1998.
Zanardi et al., "Error Avoiding Quantum Codes," Oct. 16, 1997, http://xxx.lanl.gov/PS_cache/quant-ph/pdf/9710/9710041.pdf pp. 1-9.
Zanardi, "Dissipative Dynamics in a Quantum Register," Aug. 25, 1997, http://xxx.lanl.gov/PS_cache/quant-ph-pdf/9708/9708042.pdf pp. 1-8.
Zanardi et al. "Noiseless Quantum Codes," Sep. 5, 1997, http://xxx.lanl.gov/PS_cache/quant-ph/pdf/9705/9705044.pdf pp. 1-4.
Zanardi, "Dissipation and Decoherence in a Quantum Register," Feb. 6, 1998, http://xxx.lanl.gov/PS_cache/quant-ph/pdf/9705/9705045.pdf pp. 1-10.
Lidar et al., "Decoherence Free Subspaces for Quantum Computation," Jul. 28, 1998, http://xxx.lanl.gov/PS_cache/quant-ph/pdf/9807/9807004.pdf pp. 1-4.
Lidar et al., "Concatenating Decoherence Free Subspaces with Quantum Error Correcting Codes," Apr. 28, 1999, http://xxx.lanl.gov/PS_cache/quant-ph/pdf/9809/9809081.pdf pp. 1-4.
Lidar et al., "Decoherence-Free Subspaces for Multiple-Qubit Errors. (I) Characterization," Phys. Rev. A, vol. 63, 022306, pp. 1-13, 2001.
Bacon et al., "Robustness of Decoherence-Free Subspaces for Quantum Computation," Jun. 15, 1999, http://xxx.lanl.gov/PS_cache/quant-ph/pdf/9902/9902041.pdf pp. 1-16.
Lidar et al., "Protecting Quantum Information Encoded in Decoherence Free Status Against Exchange Errors," Dec. 2, 1999, http://xxx.lanl.gov/PS_cache/quant-ph/pdf/9907/9907096.pdf pp. 1-7.
Durdevich et al., "Generalized Noiseless Quantum Codes Utilizing Quantum Enveloping Algebras," Mar. 29, 2000, http://xxx.lanl.gov/PS_cache/quant-ph/pdf/0003/0003134.pdf pp. 1-16.
Zanardi et al., "Quantum Information in Semiconductors: Noiseless Encoding in a Quantum-Dot Array," Nov. 20, 1998, http://xxx.lanl.gov/PS_cache/quant-ph/pdf/9804-9804016.pdf pp. 1-5.
Zanardi et al., "Subdecoherent Information Encoding in a Quantum-Dot Array," Nov. 19, 1998, http://xxx.lanl.gov/PS_cache/quant-ph/pdf/9808/9808036.pdf pp. 1-17.
Zanardi, "Computation on a Noiseless Quantum Code and Symmetrization," Jun. 9, 1999, http://xxx.lanl.gov/PS_cache/quant-ph/pdf/9901/9901047.pdf pp. 1-4.

Beige et al., "Driving Atoms Into Decoherence-Free States," Jun. 30, 2000, http://xxx.lanl.gov/PS_cache/quant-ph/pdf/9912/9912004.pdf pp. 1-12.
Beige et al., "Quantum Computing Using Dissipation to Remain in a Decoherence-Free Subspace," Jul. 4, 2000, http://xxx.lanl.gov/PS_cache/quant-ph/pdf/0004/0004043.pdf pp. 1-4.
Bacon et al., "Universial Fault-Tolerant Computation on Decoherence-Free Subspaces," Jun. 29, 2000, http://xxx.lanl.gov/PS_cache/quant-ph/pdf/9909/9909058.pdf pp. 1-5.
Deutsch et al., "Universality in Quantum Computation," May 24, 1995, http://xxx.lanl.gov/PS_cache/quant-ph/pdf/95050/9505018.pdf pp. 1-11.
Barenco, "A Universal Two-Bit Gate for Quantum Computation," May 24, 1995, http://xxx.lanl.gov/PS_cache/quant-ph/pdf/95050/9505016.pdf pp. 1-4.
DiVincenzo, "Two-bit gates are universal for quantum computation," Phys. Rev. A vol. 51, No. 2, pp. 1015-1022, Feb. 1995.
Lloyd, "Almost Any Quantum Logic Gate is Universal," Phys. Rev. Lett. A vol. 75, No. 2, pp. 346-349, Jul. 1995.
Sleator et al., "Realizable Universal Quantum Logic Gates," Phys. Rev. Lett. vol. 74, No. 20, pp. 4087-4090, May 1995.
Duan et al., "Qunatum Error Avoiding Codes Versus Quantum Error Correcting Codes," Sep. 19, 1998, http://xxx.lanl.gov/PScache/quant-ph/pdf/9809/9809057.pdf pp. 1-13.
Knill et al., "Theory of quantum error correction for general noise," Phys. Rev. Lett. vol. 84, No. 11, pp. 2525-2528, Mar. 2000.
Viola et al., "Dynamical Generation of Noiseless Quantum Subsystems," Feb. 25, 2000, http://xxx.lanl.gov/PS_cache/quant-ph/pdf/0002/0002072.pdf pp. 1-4.
Zanardi, "Stabilizing Quantum Information," Sep. 6, 2000, http://xxx.lanl.gov/PS_cache/quant-ph/pd/9910/9910016.pdf pp. 1-5.
Gottesman, "A Theory of Fault-Tolerant Quantum Computation," Feb. 17, 1997, http://xxx.lanl.gov/PS_cache/quant-ph/pdf/9702/9702029.pdf pp. 1-30.
Lindblad, "On the Generators of Quantum Dynamical Semigroups," Commun. Math. Phys. vol. 48, pp. 119-130, 1976.
De Filippo, "Quantum Computation Using Decoherence-Free States of the Physical Operator Algebra," Aug. 7, 2000, http://xxx.lanl.gov/PS_cache/quant-ph/pdf/9910/9910005.pdf pp. 1-16.
Landsman, "Lecture Notes on C*-algebras, Hilbert C*-modules and Quantum Mechanics," Jul. 24, 1998, http://xxx.lanl.gov/PS_cache/math-ph/pdf/9807/9807030.pdf pp. 1-89.
Kraus, States, Effects, and Operations: Fundamental Notions of Quantum Theory (Academic, Berlin, 1983).
Paz et al., "Continuous Error Correction," Jul. 24, 1997, http://xxx.lanl.gov/PS_cache/quant-ph/pdf/9707/9707049.pdf pp. 1-10.
Aharonov et al., "Fault-tolerant Quantum Computation with constant error rate," Jun. 30, 1999, http://xxx.lanl.gov/PS_cache/quant-ph/pdf/9906/9906129.pdf pp. 1-63.
Barenco et al., "Elementary Gates for Quantum Computation," Mar. 23, 1995, http://xxx.lanl.gov/PS_cache/quant-ph/pdf/9503/9503016.pdf pp. 1-31.
Dicke, "Coherence in Spontaneous Radiation Processes," *Phys. Rev.* vol. 93, No. 1, pp. 99-110, Jan. 1954.
Braunstein et al., *Scalable Quantum Computers Paving the Way to Realization* (Wiley-VCH, Berlin 2001).
DiVincenzo et al., "*Quantum Computation and Spin Electronics*," Nov. 16, 1999, http://xxx.lanl.gov/PS_cache/cond-mat/pdf/9911/9911245.pdf pp. 1-28.
Laflamme et al., "Perfect Quantum Error Correction Code," Feb. 27, 1996, http://xxx.lanl.gov/PS_cache/quant-ph/pdf/9602/9602019.pdf pp. 1-4.
Gottesman, "Fault-Tolerant Quantum Computation with Local Gates," Mar. 30, 1999, http://xxx.lanl.gov/PS_cache/quant-ph/pdf/9903/9903099.pdf pp. 1-14.
Cahn, Semi-Simple Life Algebras and Their Representations (Benjamin/Cummings, Reading, 1984), available online at http://www-physics.lbl.gov/~mcahn/book.html.
Bechmann-Pasquinucci et al., "Incoherent and coherent eavesdropping in the six-state protocol of quantum cryptography," Phys. Rev. A, vol. 59, No. 6, pp. 4238-4248, Jun. 1999.

DiVincenzo et al., "Quantum Channel Capacity of Very Noisy Channels," Nov. 3, 1998, http://xxx.lanl.gov/PS_cache/quant-ph/pdf/9706/9706061.pdf pp. 1-31. Erratum: Phys. Rev. A 59, 1717 (1999).
Kholevo, "Bounds for the quantity of information transmitted by a quantum communication channel," Probl. Inf. Transm. (U.S.S.R.), vol. 9, p. 177-183, 1973.
Inamori, "Security of EPR-based Quantum Key Distribution," Aug. 14, 2000, http://xxx.lanl.gov/PS_cache/quant-ph/pdf/0008/008064.pdf pp. 1-20.
Inamori, "Security of EPR-based Quantum Key Distribution using three bases," Aug. 16, 2000, http://xxx.lanl.gov/PS_cache/quant-ph/pdf/0008/0008076.pdf pp. 1-12.
Lamas-Linares et al., "Experimental Quantum Cloning of Single Photons," Science, vol. 296, pp. 712-714, Apr. 26, 2002.
Lutkenhaus, "Estimates for practical quantum cryptography," Phys. Rev. A, vol. 59, No. 5, pp. 3301-3319, May 1999.
Wiesner, "Conjugate Coding," Sigact News, vol. 15, No. 1, pp. 78-89, 1983.
Gottesman, Ph.D. thesis, "Stabilizer Codes and Quantum Error Correction," May 28, 1997, http://xxx.lanl.gov/abs/quant-ph/9705052 pp. 1-114.
Brown et al., "Charcterization of silicon avalanche photodiodes for photon correlation measurements. 1: Passive quenching," Appl. Opt. vol. 25, No. 22, pp. 4122-4126, Nov. 15, 1986.
Brown et al., "Charcterization of silicon avalanche photodiodes for photon correlation measurements. 2: Active quenching," Appl. Opt. vol. 26, No. 12, pp. 2383-2389, Jun. 15, 1987.
Bourennane et al., "Experiments on long wavelength (1550nm) "plug and play" quantum cryptography systems," Optics Express vol. 4,No. 10, pp. 383-389, May 1999.
Karlsson et al., "A Single-Photon Counter for Long-Haul Telecom," Circuits and Devices vol. 11, pp. 34-40, Nov. 1999.
Bourennane et al., "Experimental long wavelength quantum cryptography: from single photon transmission to key extraction protocols," J. Mod. Opt. vol. 47, No. 2/3, pp. 563-579, 2000.
Stefanov et al., "Optical Quantum Random Number Generator," Jul. 2, 1999, http://xxx.lanl.gov/PS_cache/quant-ph/pdf/9907/9907006.pdf pp. 1-4.
von Neumann, "Various Techniques Used in Connection with Random Digits," Applied Math Series, 12, US National Bureau of Standards, Wash. D.C., pp. 36-38, 1951.
Elias, "The Efficient Construction of an Unbiased Random Sequence," The Annals of Mathematical Statistics vol. 43, No. 3, pp. 865-870, 1972.
Peres, "Iterating Von Neumann's Procedure for Extracting Random Bits," Annals of Statistics, vol. 20, Issue 1, pp. 590-597, Mar. 1992.
Dautet et al., "Photon counting techniques with silicon avalanche photodiodes," Applied Optics vol. 32, No. 21, pp. 3894-3900, Jul. 20, 1993.
Ribordy et al., "performance of InGaAs/InP avalanche photodiodes as gated-mode photon counters," Applied Optics vol. 37, No. 12, pp. 2272-2277, 1998.
Yurke, "Wideband photon counting and homodyne detection," Physical Review A, vol. 32, No. 1, p. 323, Jul. 1985.
Buttler et al., "Daylight Quantum Ket Distribution over 1.6 kn," Physical Review Letters, vol. 84, No. 24, pp. 5652-5655, Jun. 2000.
Shor,."Polynomial-Time Algorithms for Prime Factorization and Discrete Logarithms on a Quantum Computer," Jan. 25, 1996, http://aps.arxiv.org/PS_cache/quant-ph/pdf/95080/9508027.pdf pp. 1-28.
Boneh et al., Quantum Cryptanalysis of Hidden Linear Functions (Extended Abstract), pp. 1-28, 1995.
Cleve et al., "Fast parallel circuits for the quantum Fourier transform," Jun. 1, 2000, http://aps.arxiv.org/PS_cache/quant-ph/pdf/00060/0006004.pdf pp. 1-22.
Knill et al., "Efficient Linear Optics Quantum Computation," Jun. 20, 2000, http://xxx.lanl.gov/PS_cache/quant-ph/pdf/0006/0006088.pdf pp. 1-8.
Cleve et al., "Fast parallel circuits for the Quantum Fourier Transform," available online: http://xxx.lanl.gov/abs/quant-ph/0006004 pp. 1-22.

Raussendorf et al., "The one-way quantum computer—a non-network model of quantum computation," Aug. 27, 2001, http://xxx.lanl.gov/abs/quant-ph/0108118 pp. 1-7.
Cleve et al., "Quantum Algorithms Revisited," Aug. 8, 1997, http://xxx.lanl.gov/abs/quant-ph/9708016 pp. 1-7.
Briegel et al., "Quantum Repeaters: The Role of Imperfect Local Operations in Quantum Communication," Phys. Rev. Lett. vol. 81, No. 26, pp. 5932-5935, Dec. 1998.
Cirac et al., "Quantum state transfer and entanglement distribution among distant nodes in a quantum network," Phys. Rev. Lett. vol. 78, No. 16, pp. 3221-3224, Apr. 1997.
van Enk et al., "Photonic channels for quantum communication," Science vol. 279, pp. 205-208, Jan. 1998.
Muller et al., "Plug and play systems for quantum cryptography," Appl. Phys. Lett. vol. 70, No. 7, pp. 793-795, Feb. 1997.
Lidar et al., "Decoherence-Free Subspaces for Multiple-Qubit Errors: (II) Universal, Fault-Tolerant Quantum Computation," Jul. 5, 2000, http://xxx.lanl.gov/PS_cache/quant-ph/pdf/0007/0007013.pdf pp. 1-26.
Duan et al., "Long-distance quantum communication with atomic ensembles and linear optics," May 22, 2001, http://xxx.lanl.gov/PS_cache/quant-ph/pdf/0105/0105105.pdf pp. 1-8.
Kok et al., "Long-distance quantum communications just around the corner?" Quantum Information and Computation, vol. 1, No. 3, pp. 87-88, 2001.
Knill et al., "Quantum Computation and Quadratically Signed Weight Enumerators," Sep. 30, 1999, http://aps.arxiv.org/PS_cache/quant-ph/pdf/99090/9909094.pdf pp. 1-7.
Maurer, "Protocols for Secret Key Agreement by Public Discussion Based on Common Information," Advances in Cryptology-Proceedings of Crypto' 92, Springer-Verlag, vol. 740, pp. 461-470, (1993).
Duan et al., "Long-distance quantum communication with atomic ensembles and linear optics: Supplementary Information," May 22, 2001, http://xxx.lanl.gov/PS_cache/quant-ph/pdf/0105/0105105.pdf pp. 1-8.
Klarreich, "Can you keep a secret?" Nature, vol. 418, Jul. 18, 2002, pp. 270-272.
Rash, "Not just sci-fi: Uncrackable encryption," Tech Update, Apr. 17, 2002 http://www.zdnet.com/filters/printerfriendly/0,6061,2861716-92,00.html pp. 1-2.
Fisher, "Experts Debate Risks to Crypto," eWeek, Mar. 27, 2002 http://www.eweek.com/print_article/0,3668,a=24663,00.asp pp. 1-2.
Smalley, "Future Tech: Hack-Proof Chatting," Discover vol. 23 No. 5, May 2002, http://www.discover.com/may_02/feattech.html pp. 1-4.
McDonald, "Quantum Computing Puts Encrypted Messages at Risk," NewsFactor Network, Jul. 8, 2002 http://www.newsfactor.com/perl/story/18490.html pp. 1-4.
Metz, "Special Report: Quantum Cryptography Arrives," PC Magazine, Aug. 6, 2002 http://www.pcmag.com/print_article/0,3048,a=29842,00.asp pp. 1-5.
Costello, "Will Aussie teleportation new improve cryptography?" IDG News Service\Boston Bureau, Jun. 19, 2002, pp. 4-5.
van Dam et al., "Quantum Algorithms for some Hidden Shift Problems," Nov. 21, 2002, http://xxx.lanl.gov/abs/quant-ph/0211140, pp. 1-12.
Moore et al., "The Hidden Subgroup in Affine Groups: Basis Selection in Fourier Sampling," Nov. 26, 2002, http://xxx.lanl.gov/abs/quant-ph/0211124, pp. 1-11.
Hallgren, "Polynomial-Time Algorithms for Pell's Equation and the principal Ideal Problem," Oct. 3, 2002, http://www.cs.caltech.edu/~hallgren/pell.pdf, pp. 1-12.
Lidar et al., "Encoded Recoupling and Decoupling; An Alternative to Quantum Error Correcting Codes, Applied to Trapped Ion Quantum Computation," Nov. 15, 2002, http://xxx.lanl.gov/abs/quant-ph/0211088, pp. 1-12.
Shiokawa et al., "Dynamical Decoupling Using Slow Pulses: Efficient Suppression of 1/f Noise," Nov. 15, 2002, http://xxx.lanl.gov/abs/quant-ph/0211081, pp. 1-5.
Byrd et al., "Combined Error Correction Techniques for Quantum Computing Architectures," Oct. 10, 2002, http://xxx.lanl.gov/abs/quant-ph/0210072, pp. 1-9.

Wu et al., "Universal Quantum Computation using Exchange Interactions and Teleportation of Single-Qubit Operations," Aug. 17, 2002, http://xxx.lanl.gov/abs/quant-ph/0208118, pp. 1-5.

Khodjasteh et al., "Universal Fault-Tolerant Quantum Computation in the Presence of Spontaneous Emission and Collective Dephasing," Oct. 11, 2002, http://xxx.lanl.gov/abs/quant-ph/0206025, pp. 1-4.

Byrd et al., "Empirical Determination of Bang-Bang Operations," May 24, 2002, http://xxx.lanl.gov/abs/quant-ph/0205156, pp. 1-14.

Lidar et al., "Quantum Codes for Simplifying Design and Suppressing Decoherence in Superconducting Phase-Qubits," Sep. 4, 2002, http://xxx.lanl.gov/abs/cond-mat/0204153, pp. 1-15.

Wu et al., "Efficient Universal Leakage Elimination for Physical Encoded Qubits," Feb. 27, 2002, http://xxx.lanl.gov/abs/quant-ph/0202168, pp. 1-4.

Wu et al., "Universal Quantum Logic from Zeeman and Anisotropic Exchange Interactions," Oct. 2, 2002, http://xxx.lanl.gov/abs/quant-ph/0211135, pp. 1-5.

Wu et al., "Creating Decoherence-Free Subspaces Using Strong and Fast Pulses," Apr. 10, 2002, http://xxx.lanl.gov/abs/quant-ph/0112144, pp. 1-4.

Byrd et al., "Comprehensive encoding and decoupling solution to problems of decoherence and design in solid-state quantum computing," Jun. 18, 2002, http://xxx.lanl.gov/abs/quant-ph/0112054, pp. 1-5.

Byrd et al., "Bang-Bang Operations from a Geometric Perspective," Oct. 25, 2001, http://xxx.lanl.gov/abs/quant-ph/0110121, pp. 1-7.

Bihary et al., "An Implementation of the Deutsch-Jozsa Algorithm on Molecular Vibronic Coherences Through Four-Wave Mixing: a Theoretical Study," Aug. 20, 2002, http://xxx.lanl.gov/abs/quant-ph/0110041, pp. 1-14.

Wu et al., "Qubits as Parafermions," May 28, 2002, http://xxx.lanl.gov/abs/quant-ph/0109078, pp. 1-17.

Lidar et al., "Reducing Constraints on Quantum Computer Design by Encoded Selective Recouping," Dec. 20, 2001, http://xxx.lanl.gov/abs/quant-ph/0109021, pp. 1-5.

Wu et al., "Polynomial-Time Simulation of Pairing Models on a Quantum Computer," Jun. 19, 2002, http://xxx.lanl.gov/abs/quant-ph/0108110, pp. 1-5.

Brown et al., "Quantum Computing with Quantum Dots on Quantum Linear Supports," May 22, 2001, http://xxx.lanl.gov/abs/quant-ph/0105102, pp. 1-26.

Wu et al., "Power of Anisotropic Exchange Interactions: Universality and Efficient Codes for Quantum Computing," Nov. 14, 2001, http://xxx.lanl.gov/abs/quant-ph/0103039, pp. 1-5.

Bacon et al., "Encoded Universality in Physical Implementations of a Quantum Computer," Apr. 13, 2001, pp. 1-6.

Zadoyan et al., The manipulation of massive ro-vibronic superpositions using time-frequency-resolved coherent anti-Stokes Raman scattering (TFRCARS): from quantum control to quantum computing, http://xxx.lanl.gov/abs/physics/0102091, pp. 1-59.

Vala et al., "Encoded Universality for Generalized Anisotropic Exchange Hamiltonians," Apr. 4, 2002, http://xxx.lanl.gov/abs/quant-ph/0204016, pp. 1-15.

Kempe et al., "Eact gate-sequences for universal quantum computation using the XY-interaction alone," May 23, 2002, http://xxx.lanl.gov/abs/quant-ph/0112014, pp. 1-11.

Kempe et al., "Encoded Universality from a Single Physical Interaction," Dec. 3, 2001, http://xxx.lanl.gov/abs/quant-ph/0112013, pp. 1-20.

* cited by examiner

EFFICIENT QUANTUM COMPUTING OPERATIONS

CROSS-REFERENCE TO RELATED APPLICATIONS

This application claims priority under 35 USC 119(e) to U.S. provisional application Ser. No. 60/294,089, filed May 29, 2001.

BACKGROUND OF THE INVENTION

1. Field of the Invention

The present invention relates to the field of computing and more particularly to quantum computing.

2. Description of the Background

In electronic circuits a gate is a digital logic operation embodied in a circuit having at least one digital input, or bit, and having one digital output, or bit, wherein the circuit generates a value of the output that depends upon the values of the inputs. The gate references the manipulation of the input bits to generate the value of the output bit. Measures of circuit efficiencies include speed of performing their operation and number of gates required to perform their operation.

The input size of a circuit means the number of bits that are in the input. The most common circuit input measurements are the depth of the circuit and the size of the circuit. The depth of the circuit relates to the highest number of gates that must be traversed by a signal before an answer is computed. The size of a circuit is the total number of gates in the whole circuit. For example, a circuit that computes simple addition of 2 n-bit binary integers has input size of 2n. These values as functions allow predicting the size of a circuit as the input size varies.

If a function that expresses the size of a circuit for computing a specified computation grows very quickly as the input size increases then that computation problem is only efficiently solvable for small inputs. Thus when comparing sizes of circuits as expressed by a function of the input size one compares their asymptotic growth, that is their growth as the input size approaches infinity.

A circuit has polynomial size if the circuit has a size that is expressed as a polynomial of the input size. A circuit has logarithmic depth if the depth of the circuit is expressed as a logarithm of the input size. A special notation, called big-Oh ("O") notation, is used to express functions, and thus circuit sizes or depths, in a way that only expresses the class of the function. For example, $O(n^2)$ is the class of functions whose size increases polynomially with increasing input size no faster than some constant coefficient times $n^2$. This notation is more specific than just claiming polynomial size. Generally a circuit is considered efficient if it has polynomial size. In the current Invention, the primary concern is the depth of a circuit. The terminology of an efficient circuit here generally refers to the fact that its depth is either logarithmic or poly-logarithmic.

The same notations for describing circuit efficiency are used to describe the probability of error of a given circuit. The probability of error of a circuit may be expressed as a function of the circuit's input size. Probability of a circuit producing an error is denoted by an epsilon, $\epsilon$. Exponentially small probability of error means that the probability of error is $1/f(n)$, where $f(n)$ is in $O(2^n)$. Probability of error is $1/f(n)$, in a circuit design, is generally considered to be acceptable because errors caused by circuit malfunction or other problems exist with higher probabilities than this probability.

Quantum computation or quantum information processing (QIP) has developed methods for using quantum information for computing. Quantum states are denoted with the ket symbol and written in the form |x> where x represents a quantum wave function. A superposition defining a single qubit's state is written $|x\rangle = \alpha|0\rangle + \beta|1\rangle$ where alpha and beta are complex number weighting coefficients. The sum alpha squared plus beta squared is normalized to one so that the probability of the observable quantity associated with |x> is one.

A problem implementing quantum circuits is data loss due to interaction of qubits with particles in the environment causing changes in the qubit's quantum mechanical state. The loss of qubit data due to interaction with the environment is named decoherance. Generally applicable methods for combatting decoherence exist. For instance, implementing quantum error correcting codes or decoherence free subsystems may reduce decoherence.

The present inventors recognized that minimizing depth of quantum circuits may speed up computation and reduce data loss by reducing time qubits in the circuit are exposed to interaction with the environment since increasing quantum circuit depth increases quantum computing time. Thus, the present inventors recognized that logarithmic or poly-logarithmnic depth circuits offer a great advantage over polynomial depth circuits. In classical computing, it is important to define what physical states correspond to a "0" or a "1" in a mathematical computation. Similarly, in quantum computing, it is important to define a computational basis. For a single qubit, the states |0> and |1>, representing the number 0 and 1 respectively. For n qubits, the computational basis is simply defined as the tensor product space of the individual qubits of the $2^n$ possibilities from |00 . . . 0>, |00 . . . 1>, |00 . . . 10> to |11111>. For simplicity, when discussing an n-qubit register as a single entity, it is common to simply refer to the state of all zeroes |00 . . . 0> as |0>.

Certain quantum computing mathematical operations, also called gates, are much like logical gates AND and NOT classical computing functions. Common quantum computing gates include the Hadamard gate. The Hadamard gate acts on a single qubit. The Hadamard gate converts the qubit state $$|0\rangle \text{ to } \frac{1}{\sqrt{2}}|0\rangle + \frac{1}{\sqrt{2}}|1\rangle$$

and converts the qubit state $$|1\rangle \text{ to } \frac{1}{\sqrt{2}}|0\rangle - \frac{1}{\sqrt{2}}|1\rangle.$$

Another common gate is the quantum controlled-NOT gate, which acts in some ways as the classical XOR. The quantum controlled-NOT gate acts on two qubits, a control qubit and a qubit to be negated. If the control qubit is in state |1> then the second qubit is negated, otherwise nothing occurs. If the second qubit is initially |0>, then this gate will XOR the state of the control qubit onto the second bit.

Another common two-qubit gate is the controlled phase shift gate, sometimes referred to as "the controlled θ" gate. The controlled θ gate maps |x>|y> to $e^{i\theta xy}$ |x>|y>.

All quantum computing operations ma) be composed of combinations of quantum one bit gates and quantum two bit controlled-NOT gates, and those gates have been realized in physical systems, such as quantum computing NMR systems.

The discrete Fourier transformation is referred to herein after as DFT. DFT is a mathematical mapping from one finite set of complex numbers to another set of complex numbers of similar size. DFT is defined by the following equation for two sets of complex numbers $(\alpha_0, \alpha_1, \ldots \alpha_{m-1})$, and $(\beta_0, \beta_1, \ldots \beta_{m-1})$ where $$\beta_x = \frac{1}{\sqrt{m}} \sum_{y=0}^{m-1} (e^{2I h/m})^{x \cdot y} \alpha_y$$

DFT can be computed with depth O(m log m) by the fast Fourier transform. DFT has many useful applications because of its computational efficiency expressed by its low order depth. The efficiency of the DFT is one of the most important algorithms in classical computing.

Application of the DFT to transform the amplitudes of particular qubits or collections of qubits in quantum circuits is called the Quantum Fourier Transformation, referred to herein after as the QFT. Current methods for performing exact or approximate QFT on n qubits have polynomial depth.

QFT already has many applications in quantum computing, such as algorithms of Shor to efficiently compute discrete logarithms and factor numbers. See Shor, "Polynomial-Time Algorithms for Prime Factorization and Discrete Logarithms on a Quantum Computer" SIAM Journal of Computing, Volume 26, Number 5, pages 1484–1509 (1997) and D. Boneh and R. J. Lipton, "Advances in Cryptology: Proceedings of Crypto'95", Lecture Notes in Computer Science, Vol., 963, 424 (1995). Current RSA cryptography systems make use of the assumption that factoring large numbers is generally a computationally time intensive task for large integers. Shor's algorithm contravenes that assumption. Therefore, current cryptography systems are no longer secure.

A computational basis state of size n is defined to be a state |x> representing an arbitrary n-bit binary number.

A Fourier basis state for a computational basis state is the QFT of the computational basis state. Thus, the |Px> is the QFT of the computational basis state |x>, which means that |Px> is the result of applying the QFT to |x>.

The paper, Cleve and Watrous, "Fast parallel circuits for the quantum Fourier transform" in Proceedings of the 41st Annual IEEE Symposium on Foundations of Computer Science (FOCS '00), pages 526–536 (2000), is incorporated herein by reference. Universal quantum gates and universal quantum computers are disclosed in "Elementary gates for quantum computation" Barenco, Bennett, Cleve, DiVincenzo, Margolus, Shor, Sleator, Smolin, and Weinfurter, Physical Review A, Volume 52, Number 5, pages 3457–3467 (1995), which is incorporated herein by reference. Quantum gates designed to avoid erroneous data caused by decoherence are disclosed in Gottesman, "Stabilizer Codes and Quantum Error Correction" http://xxx.lanl.gov/abs/quant-ph/9705052, which is incorporated herein by reference.

Quantum computing with local gates and models for scaling quantum computing are disclosed in Fault-Tolerant Quantum Computation with Local Gates", D. Gottesman http://xxx.lanl.gov/abs/quant-ph/9903099 and "Efficient Linear Optics Quantum Computation" by Knill, Laflamme and Milburn, http://xxx.lanl.gov/abs/quant-ph/0006088, Braunstein and Lo, "Scalable Quantum Computers" (2000), which are incorporated herein by reference.

The quantum operations defined herein below are physical operations performed on quantum states of the qubits defining a data processing component of a quantum computing circuit. Quantum computing circuits include sets of universal quantum gates. A universal quantum gate is a fundamental logical building block from which any quantum circuit can be embodied. Universal quantum gates have been successfully implemented in a 7 qubit quantum computer to factor the number 15. That computer employed nuclear spin ½ moments as qubits, and employed nuclear magnetic resonance technology to perform operations on those qubits analogous to classical gates to factor the number 15.

SUMMARY OF THE INVENTION

It is an object of the invention to provide systems and methods for efficient quantum computing.

It is another object of the invention to provide systems and methods for efficiently performing QFT.

It is another object of the invention to provide systems and methods for efficiently performing QFT for state spaces of dimension $2^n$.

It is another object of the invention to provide systems and methods for efficiently performing QFT for state spaces of arbitrary dimension.

In one aspect, the invention provides a system and method for quantum computing, comprising (1) creating an n qubit Fourier basis state of a n qubit computational basis state, (2) generating multiple copies of the n qubit Fourier basis state in additional sets of n qubits, and (3) estimating the phase of the Fourier basis state from the copies of the Fourier basis state. Additional aspects of this invention include erasing the computational basis state from the b qubits whose values represent the computational basis state; and erasing said multiple copies of the n qubit Fourier basis state. In additional aspects, this invention provides a system and method for estimating the phase x of a quantum state using a quantum circuit and multiple copies of a Fourier state|Px> of modulus m, said method comprising simulating measurements on multiple copies of a state; obtaining an approximation to the fractional part of $2^{-j}$ x for each j; reconstructing an approximation ~x to x wherein a depth of the quantum circuit is O(Polynomial(log(log m))).

In another aspect, the invention provides a system and method for performing QFT for a modulus m, comprising creating a Fourier basis state |Px> of a computational basis state x; multiply copying the Fourier basis state; erasing the computational basis state by estimating the phase of the Fourier basis state; reversing the multiply copying operation; and wherein the depth of the circuit is O(Polynomial (log log m)). In additional aspects, this invention provides a system and method where $m=2^n$ for a positive integer n; simulating measurements on multiple copies of a state; wherein said estimating the phase of the Fourier basis state comprises simulating measurements on multiple copies of a state.

In another aspect, the invention provides a system and method for performing Fourier transformation with respect to a modulus m where $m=m_1 m_2 \ldots m_k$ for $m_i$ pair wise relatively prime and $m_j$ in O(log m) of a computational basis state |x>, comprising storing a modular representation of |x> defined by the following transformation:

$$|x>|0,0,\ldots,0> \text{ to } |0>|\text{xmod } m_1>, |\text{xmod } m_2>, \ldots, |\text{xmod } m_k>,$$

where $m_i$ for i=1 to k are pair wise relatively prime integers in O(log m) such that modulus m=$m_1 m_2 \ldots m_k$ multiplies each S1002i by an integer, $g_i$; and computing the QFT modulus $m_i$ in logarithmic depth. Additional aspects of this invention include applying Fourier Transform to each component $m_i$; wherein a depth of the operation is O(Polynomial (log(log m))).

In yet another aspect, the invention provides a system and method for factoring a large integer m or solving a hidden linear form problem of input size of order log(m) bits comprising classical pre-processing; quantum computing comprising: (1) creating an n qubit Fourier basis state of a n qubit computational basis state, and (2) generating multiple copies of the n qubit Fourier basis state in additional sets of n qubits, and (3) estimating the phase of the Fourier basis state from the copies of the Fourier basis state; and classical post-processing. An additional aspect of this invention that operations are of depth O(Polynominal(log log m)).

These and other objects of the invention are also provided by a system and method for estimating the phase of a quantum state including means for generating multiple copies of a Fourier transform of the quantum state.

One method of the invention comprises five steps. First, quantum gates are manipulated to create a Fourier basis state from a computational basis state. Second, the Fourier basis state is copied multiple times. Third, the phase of the Fourier basis state is estimated from the Fourier basis states. Fourth, the estimated phase is used to erase the computational basis state from the input qubits. Fifth, the copies of the Fourier basis state are erased by a reverse of the operation that copied them.

Systems defining qubits include spin ½ particles whose quantized property can be measured and manipulated by external stimuli and means for providing the external stimuli.

One example of a qubit includes spin ½ nuclei and equipment designed to generate nuclear magnetic resonance in the nuclei to change and measure the spin state of the nuclei. A more specific example is an organic molecule that provide different local fields at different molecular Carbon nuclei sites in the molecule. The nuclear moment of $C^{13}$ is sensitive to local fields. Fabricating such an organic molecule with the isotope $C^{13}$ in different molecular carbon sites in the molecule provides different resonance frequencies for nuclear magnetically resonating the $C^{13}$ nuclei, depending upon the molecular position of the $C^{13}$ atoms, thereby enabling the different sites to be used as a distinct qubits.

Another example of a qubit is a superconducting current loop maintained between two quantized current states (the so-called flux states in the quantum computing community), and a device to measure the current and to apply magnetic fields in the neighborhood of the loop to change and measure the current in the loop. Applied magnetic fields may change the state of the loop by changing the (relative energy difference and the height of the tunneling barrier between the two flux states in the) Hamiltonian of the superconducting current loop in a well-controlled time-dependent manner. The state of the superconducting loop may be measured by, for example, a separate DC-SQUID that acts as a magnetometer. Other designs for superconducting qubits include using charge eigenstates or a combination or superposition of flux/charge states as qubits. In one recent work, the measured quality factor of quantum coherence is reported to be about 25,000, which is sufficiently high that solid-state quantum computers based on this type of circuits would have utility.

Another example of a qubit is an ion trap in which quantum information is stored and processed in the internal states of trapped ions and/or collective vibrational modes of the trapped ions. Ions are cooled by various laser cooling and evaporation cooling techniques and then trapped by possibly time-dependent electromagnetic fields in a mesoscopic area. Trapped ions and means for exciting those ions (such as laser pulses) may, therefore be used for quantum computing. The presence or absence of fluorescence can be used for detection and the output of such a quantum information processor. Quantum correlations, also called entanglement, between trapped ions have recently been experimentally observed. The power of decoherence free subsystems in reducing decoherence has been experimentally demonstrated in ion traps. There are also proposals for the transfer of ions between a network of ion traps.

Another example of qubits are cavity quantum electrodynamics where quantum information is stored and processed in cavity electromagnetic modes or internal states of atoms traversing the cavity. Cavity quantum electro-dynamics include excitation sources for exciting the modes or molecules such as lasers and microwave sources coupled to the cavity and detection sources such as power meters or photon counters.

Other examples of qubits include quantum dots, linear quantum optics plus single photon detectors, neutral atoms in optical lattices, electrons flowing on Helium, surface acoustic waves and silicon-based proposals.

The present invention also includes a method for computing Shor's quantum factoring algorithm with a combination of logarithmic depth quantum circuits, and polynomial depth classical circuits. This method first randomly chooses an integer and checks if it shares any factors with the integer to be factored. Failing this it proceeds onto the quantum portion of the process that determines information about the order of the random integer in Z_N (i.e., Z with A subscript N, which is a ring of numbers from 0 to N−1 under standard addition and multiplication modulo N and the periodicity refers to the standard multiplication operation modulo N) by using the QFT. This is followed by classical implementation of the continued fractions algorithm and some post-processing to complete the process.

The present invention also provides a method that is a parallelization of Shor's mixed radix method for computing the QFT. This method is quite similar to Shor's method, but parallelizes particular steps so that the entire method runs in logarithmic depth.

BRIEF DESCRIPTION OF THE FIGURES

Embodiments of the invention are described in connection with the following figures and their descriptions.

DESCRIPTION OF THE PREFERRED EMBODIMENTS

Figure 1:
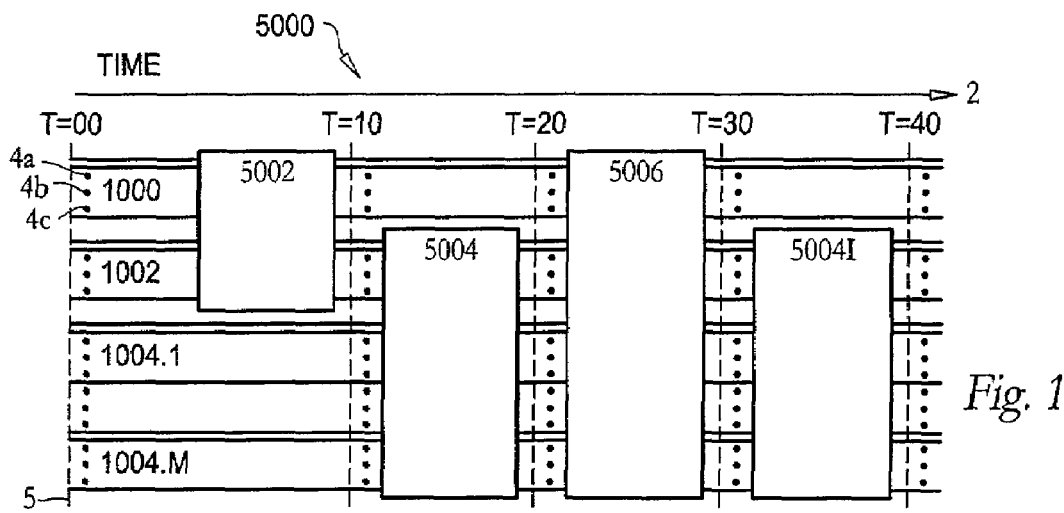
FIG. 1 is an exemplary representation of quantum operations for calculating QFT for modulo $2^n$.

FIGS. 1–7 represent time evolution of qubits in a physical system forming the data processing unit of a quantum computer. In FIGS. 1–7, time increases from left to right. In FIGS. 1–7, each horizontal line represents the information content of the spin states of a spin ½ particle, a qubit of the data processing unit. Rectangles represent physical operations performed on the qubits whose lines intersect the rectangle. In FIGS. 1–7, numbers in the range 0–40 label sequential times. In FIGS. 1–7, numbers in the range 1000 to 1010 label sets of approximately equal numbers, n, of qubits. In FIGS. 1–7, numbers in the range 5000–5032 label rectangles representing physical operations on qubits. Numbers representing inverses of a physical operation have an "I" suffix. An inverse of a quantum operation requires the same depth and size as the operation. Modulus $2^n$ herein refers indirectly to the fact that there are $2^n$ basis states necessary to describe the state of n spin ½ particles FIG. 1 represents computing a QFT modulo $2^n$ of an initial basis state |x>. FIG. 1 shows a time sequence in which arrow 2 indicates direction of increasing time. In the time sequence, dashed lines 00, 10, 20, 30, 40 are specified times. Each horizontal line represents the quantum state as a function of time of a spin ½ particle. Each dot 4a, 4b, 4c represents additional quantum states of additional spin ½ particles. Boxes 5002, 5004, and 5006 each represent operations involving a plurality of spin 1 particles. The spin ½ particles involved in an operation represented by each box 5002, 5004, 5006, are the spin ½ particles the representative lines for which intersect that box. Elements 1000, 1002, 1004.1, ... 1004.M each represent the quantum states of a set of n qubits, often referred to herein below preceded by a "Q" to denote that they each represent sets of qubits. As shown, element Q1000 represents a set of quantum states including states of particles represented by horizontal lines and dots 4a, 4b, 4c. Each set of three dots adjacent each one of quantum states of sets of qubits Q1000, Q1002, Q1004.1, ... Q1004.M represent that fact that each of those elements includes n qubits. M is O(log n). Q1004.1 ... Q1004.M are referred to herein below as ancilla qubits.

QFT 5000 represents the result of operations 5002, 5004, 5006, and 5004I in the time sequence shown in FIG. 1.

An evolution operator in quantum mechanics is linear. Therefore, to specify the action of an evolution operator on a general state, it is sufficient to specify its action on the computational basis |x> and extend such an action by linearity. The fact that an evolution operator U is a linear operator acting on a Hilbert space H means that U (alpha |a>+beta|b>)=alpha (U|a>)+beta (U|b>) ) for all complex values of alpha and beta and for all vectors |a> and |b> in H. For this reason, to define a linear operator U in a Hilbert space H, one only needs to specify the resulting states U|u_13 i>'s for a basis |u_i>'s in the Hilbert space, H. In the context of quantum computing, it is often convenient to pick |u_i>'s as a computational basis in H. Consider at time t=00: qubits Q1000 have been initialized to be in a computational basis state, |x>, qubits 1002 have been set to an initial state |0>, and qubits Q1004i for i=1 to n have each been initialized to the initial state |0>. |x> contains n qubits, and it can therefore represent a predetermined number from 1 to $2^n$ (or any predetermined one of n values in some representation). The states |0> is defined in the chosen representation to represent numeric zero. Thus, at t=00, Q1000=|x>, and Q1002 and Q1004i each equal |0>.

As shown in FIG. 1: operation 5002 is applied at time between 00 and 10 to qubit sets Q1000 and Q1002; operation 5004 is applied at time between 10 and 20 to qubit sets Q1002, Q1004.1, ... Q1004.M; operation 5006 is applied at time between 20 and 30 to qubit sets Q1000, Q1002, Q1004.1 ... Q1004.M; and operation 5004I is applied at time between 30 and 40 to qubit sets Q1002, Q1004.1 ... 1004.M. M is in O(log n), since O(n log n) ancilla qubits 1004 ... 1004.M are needed as extra workspace for the implementation of the QFT algorithm disclosed herein to efficiently provided exponentially small errors in the QFT output.

Operation 5002 is applied to Q1000 and Q1002. Operation 5002 converts qubits Q1002 to the Fourier basis state, |Px> (also referred to herein as |Ψx), leaving Q1000=|x>, and Q1004i=|0>.

Operation 5004 is applied to Q1002 and Q10041 ... Q1004M. Operation 5004 copies |Px> from Q1002 to each Q1004i. Operation 5004 leaves Q1000=|x> and Q1002=|Px>. We name operation 5004 the Fourier state reproducer operation.

Operation 5006 gives an estimate of the value of x from a finite number of copies of the state |Px>. An error may occur in such an estimation. An error as defined herein refers to an event in the context of classical probability theory in which the estimated value of x is different from the actual value of x. Different types of errors mean different events corresponding to the different estimated values of x. In quantum mechanics, the total error probability is the sum of the error probabilities of all possible types of errors and is given by a sum of the squared amplitude for all possible types of errors. Now, O(log(n/epsilon)) copies of |Px> are needed to ensure that the total error probability is at most epsilon. In other words, the number of copies of |Px> must grow at least logarithmically with n, for any fixed bound, epsilon, on the total error probability.

Operation 5006 acts on all qubits. Operation 5006 with high probability erases the initial basis state from Q1000 placing Q1000 in |0>, leaving Q1002 and each Q1004i in |Px>. As discussed in the preceding paragraph, O(log n) copies of |Px> are used by operation 5006 to ensure that the error probability is bounded by some small epsilon.

By definition, the inverse of an operation applied immediately after the application of the operation places a set of quantum states upon which the operation acts in the same state in which the set of quantum states existed immediately prior to the operation.

Operation 5004I represents an operation that is the inverse of operation 5004. Operation 5004I changes each Q1004i from |Px> to |0>, and it leaves Q1000 in |0> and Q1002 in |Px>.

The useful data output for QFT 5000 consists of the value represented by the state |Px> of the n qubits Q1002.

The QFT method of FIG. 1 results with high probability in the Fourier basis state |Px> (Fourier basis state having phase x) of the computational basis state |x> stored in qubits 1002 and all the qubits 1004 . . . 1004.M in the state in which they started, denoted |0>.

Operations 5002, 5004, and 5006 are each poly-logarithmic depth quantum circuits, as shown below.

Figure 2:
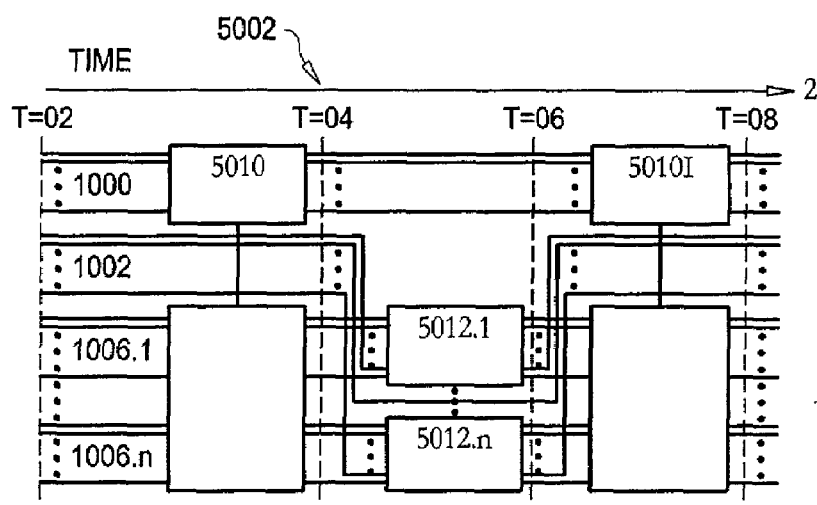
FIG. 2 is an exemplary representation of operations forming element 5002 in FIG. 1, which is the Fourier state computation for modulo $2^n$.

FIG. 2 shows details of operation 5002 of FIG. 1. FIG. 2 shows times 02, 04, 06, and 08, and operations 5010, 5012.1 . . . 5012.n, and 5010I.

In FIG. 2, operation 5010 operates on Q1000 and Q1006.1, . . . , Q1006.n Operation 5010 copies |x> into Q1006i for i=1 to n, and leaves Q1000 in |x> and Q1002 in |0>. There are $O(n^2)$ ancilla qubits, Q1006, which will hold approximately n copies of Q1000 at time 04–06.

Operation 5012.1 operates on one qubit of Q1002 and Q1006.1, operation 5012.2 operates on another qubit of Q1002 and Q1006.2, . . . , and operation Q5012.n operates on the nth qubit of Q1002 and Q1006.n. Operations 5012.i changes Q1002 from |0> to |Px>, and keeps Q1006i, for all i=1 to n, as |x>, and leaves Q1000 in |x>.

Operation 5010I is the inverse of operation 5010. It operates on Q1000 and Q1006.1 . . . Q1006.M. Operation 5010I changes Q1006.i from |x> to |0> for all i.

In 5010, a first layer of controlled NOT gates contains n gates, effectively XORing the classical input qubits 1000 onto the qubits 1006.1. This doubles the number of instances of |x>.

In 5010, operating on a second layer of controlled NOT gates contains 2n gates that then copy the qubits in Q1000 and Q1006.1 onto the qubits Q1006.2 and Q1006.3. The second layer also doubles the number of instances of |x>.

In 5010, operating on a third layer of controlled NOT gates, 4n gates, copy qubits in Q1000, Q1006.1, Q1006.2, and Q1006.3 into qubit sets Q1006.4 to Q1006.7. The third layer also doubles the number of instances of |x>.

In 5010, operating each additional layer of controlled NOT gates doubles the number of instances of |x>.

Since the number of gates in each additional layer of controlled NOT gates doubles the number of instances of |x>, 5010 operates to copy Q1000 n times with logarithmic depth in n, the number of input gates.

The inventors recognized that not all of the ancilla qubits 1006 that are copied by operation 5010 are required for operation 5012 so the size of operation 5010 can be reduced by using only the lesser number of copies resulting in $O(n^2)$ ancilla bits, instead of exactly $n^2$ instances.

Operation 5002 makes use of the fact that the Fourier basis state can be expressed as a factorization into n qubits for modulus $2^n$. Cleve, Ekert, Macchiavello, and Mosca present this factorization in "Quantum Algorithms Revisited", Proceedings of the Royal Society of London, Series A, Volume 454, Number 1969, pages 339–354, which is incorporated herein by reference.

Operation 5012.i computes the phase of the ith output qubit in Q1002. Each 5012.i contains one Hadamard gate operation, O(n) controlled NOT gate operations and i controlled phase shift gate operations. Only one output qubit from Q1002 is input into each operation 5012.i. The n qubits from Q1006.i are also inputs into each operation 5012.i. In addition, n−1 ancillary qubits, not shown in FIG. 2, are also inputs into each operation 5012.i. Those n−1 ancillary qubits are each prepared in the state |0>.

Operation 5012.i consists of four steps. The first step is to apply a single Hadamard gate to the output qubit from Q1002. The second step is a concatenation of controlled NOT gates. More specifically, in the first layer of the second step, a single controlled NOT gate is applied with the output qubit from Q1002 as the source and one of the additional ancillary qubit as the target. Note that such a controlled NOT gate creates two entangled copies of the original output qubit from Q1002. In other words, the number of entangled copies of the output qubit from Q1002 is doubled by the first layer of the second step. In the second layer of the second step, two controlled NOT gates are applied. Each of the two entangled copies is now used as the source of each of the two controlled NOT gates. Two of the additional ancillary qubits are used as the two target qubits of the two controlled NOT gates. Note that, after the second layer of the second step, the number of entangled copies of the original output qubit from Q1002 is four. In other words, the second layer of the second step doubles the number of the entangled copies. These four entangled copies can now be used as the source in subsequent layers of the second step of controlled NOT gates. Since each layer of the second step doubles the number of entangled copies of the output qubit from Q1002, by applying only O (log n) layers of controlled NOT gates, one can generate n entangled copies of the output qubit from Q1002. This completes the second step of operation 5012.i.

The third step of operation 5012.i is a parallel application of controlled phase shift gates. It is, thus, of constant depth. Each of the n entangled copies of the output qubit from Q1002 is now used as a target qubit of a controlled phase shift gate. Each of the n qubits in Q1006.i is used as a source qubit of a controlled phase shift gate. Conditional on the state of the source qubit, a controlled phase shift gate may rotate the phase of the target qubit by a certain degree, changing the values of the amplitude vector. The angle or degree of phase shift depends on the particular qubit and the particular value of i of the set Q1006.i. More concretely, if one labels the qubits of Q1006.i backwards from n to 1, i.e., |x>=|x_n . . . x_2x_1>, then the phase shift in the controlled phase shift gate that applies to |x_j> is given by $2^{j-i}$ Pi.

The fourth step of operation 5012.i is the inverse of the step of operation 5012.i. All four steps of operation 5012.i can be done in logarithmic depth in n. Therefore, operation 5012.i as a whole can be done in logarithmic depth in n. The above description of 5012.i refers to an exact preparation of the Fourier basis state. However, an approximate preparation of the Fourier basis state can be done with even fewer gates. Such an approximate preparation may, for example, simply throw away controlled phase shift gates where the phase shifts are insignificant. Such an approximate preparation is often sufficient in applications including Shor's factoring algorithm. The process of operation 5012.i is described in detail in "Fast parallel circuits for quantum Fourier transform" cited herein above.

Figure 3:
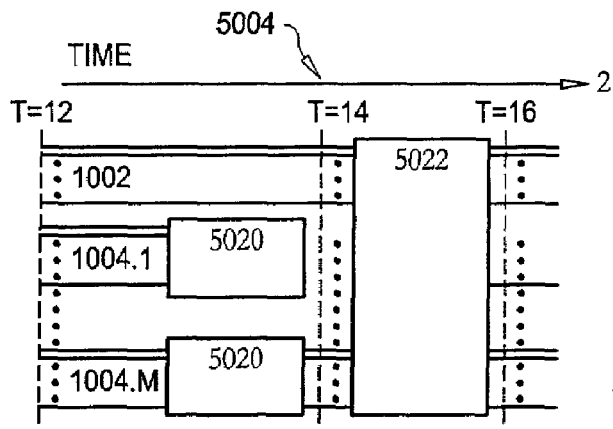
FIG. 3 is an exemplary representation of operations forming element 5004 in FIG. 1, which is the Fourier state reproducer operation.

FIG. 3 shows details of operation 5004 of FIG. 1. FIG. 3 shows times 12, 14, 16, and operations 5020 and 5022. FIG. 3 shows operations resulting in copying of the Fourier basis states into the 1004.1, . . . 1004.M.

Operation 5020 operates on Q1004.1, . . . , Q1004.M. Operation 5020 changes each Q1004i from |0> to |P0>, and leaves Q1000 in |x> and Q1002 in |Px>.

Operation 5022 operates on Q1002 and Q1004.i . . . , Q1004.M. Operation 5022 changes Q1004.1, . . . , Q1004.M from |P0> to |Px>.

For any computational basis states |x> and |y>, applying an operation that maps |x>|y> to |x>|y−x> to an initial input |Px>|Py> results in an output state |Px+y> |Py>. Applying this operation to an initial input |P_0>|Px> copies the Fourier basis state|Px> resulting in |Px>|Py>. This operation is easily implemented in quantum computing since |P_0> can be obtained by applying a Hadamard gate to n qubits initialized to zero.

Operation 5020 computes the state |P_0> M times in each of the qubits 1004.$i$ for i from 1 to M. In this case, M has value O(log n). Operation 5020 computes |P_0> for each 1004.$i$. Operation 5020 is the Hadamard transformation of dimension n. Operation 5020 applies one Hadamard gate to each of the qubits in 1004.$i$ in parallel. Operation 5020 has constant depth. At time 14, the Q1002 still contain the state |Px> from time 12 and the qubits 1004 contain O(log n) copies of |P_0>.

The state |P_0> |Px> transformed according to the mapping |x> |y> to |x> |y−x> (reversible subtraction) results in |Px> |Px>. Thus to copy the qubits 1002 into the qubits 1004.1 we have to apply the reversible subtraction on these qubits.

Operation 5022 takes as input at time 14 the qubits 1002 and 1004. There are two alternative embodiments for Operation 5022. In the first embodiment (Embodiment A), of operation 5022, a simple standard divide and conquer technique is applied. The first layer of Embodiment A takes Q1002 and one of the sets Q1004, say Q1004.1, as the input. It applies a modulo $2^n$ subtraction operation, which is defined by

|x>|y> to |x>|y−x>, with Q1004.1 as the first n-qubit register and Q1002 as the second n-qubit register.

As noted in preceding paragraphs, this gives two copies of |Px>. The number of copies of |Px> is doubled by the first layer of Embodiment A. The second layer of Embodiment A takes Q1002, Q1004.1, Q1004.2 and Q.1004.3 as the inputs. It applies a modulo 2^n subtraction operation with Q1004.2 as the first register and Q1002 as the second register. In parallel, it also applies a modulo $2^n$ subtraction operation with Q1004.3 as the first register and Q1004.1 as the second register. The result of the second layer of Embodiment A is four copies of |Px>. Therefore, the second layer of Embodiment A doubles the Number of copies of |Px>. In summary, the number of copies |Px> is doubled each time a layer of Embodiment A is applied. Therefore, only O(log M) layers of Embodiment A is required to generate M copies of |Px>. The total depth of the circuit of Embodiment A is O (log M log n)=O ((log n) (log log n)) Because M=O (log n).

The second Embodiment (Embodiment B) of operation 5022 can reduce this depth further to O (log n). The inventors recognized that this reduction in depth can be achieved by combining and paralleling two standard operations in classical circuit design. The first operation called carry-save adder allows computation of the reversible subtraction operation in constant depth. Then the parallel process of telescoping subtraction (the inverse of the more common parallel prefix addition) can join enough carry-save adders in parallel in a way similar to the layering of controlled-NOT gates in operation 5010. Note that the (reversible) prefix addition is defined as the following Mapping: |x_1>>|x_2>. . . |x_k> to |x_1>|x_1+x_2>. . . |s_1+x_2+. . . x_k>. The (reversible) telescoping subtraction is defined as the following mapping: |s_1>|x_2> . . . |x_k> to |x_1>|x_2−x_1>. . . |x_k−x_{k1}>. The parallelization of these operations is described in detail in "Fast parallel circuits for the quantum Fourier transform" cited herein above. This accomplishes the task of performing O(log n) subtractions in logarithmic depth. At time 16 the qubits 1002 will remain in state |Px> from time 14, but the qubits 1004 now contain O(log n) copies of |Px> in each 1004.$i$.

Figure 4:
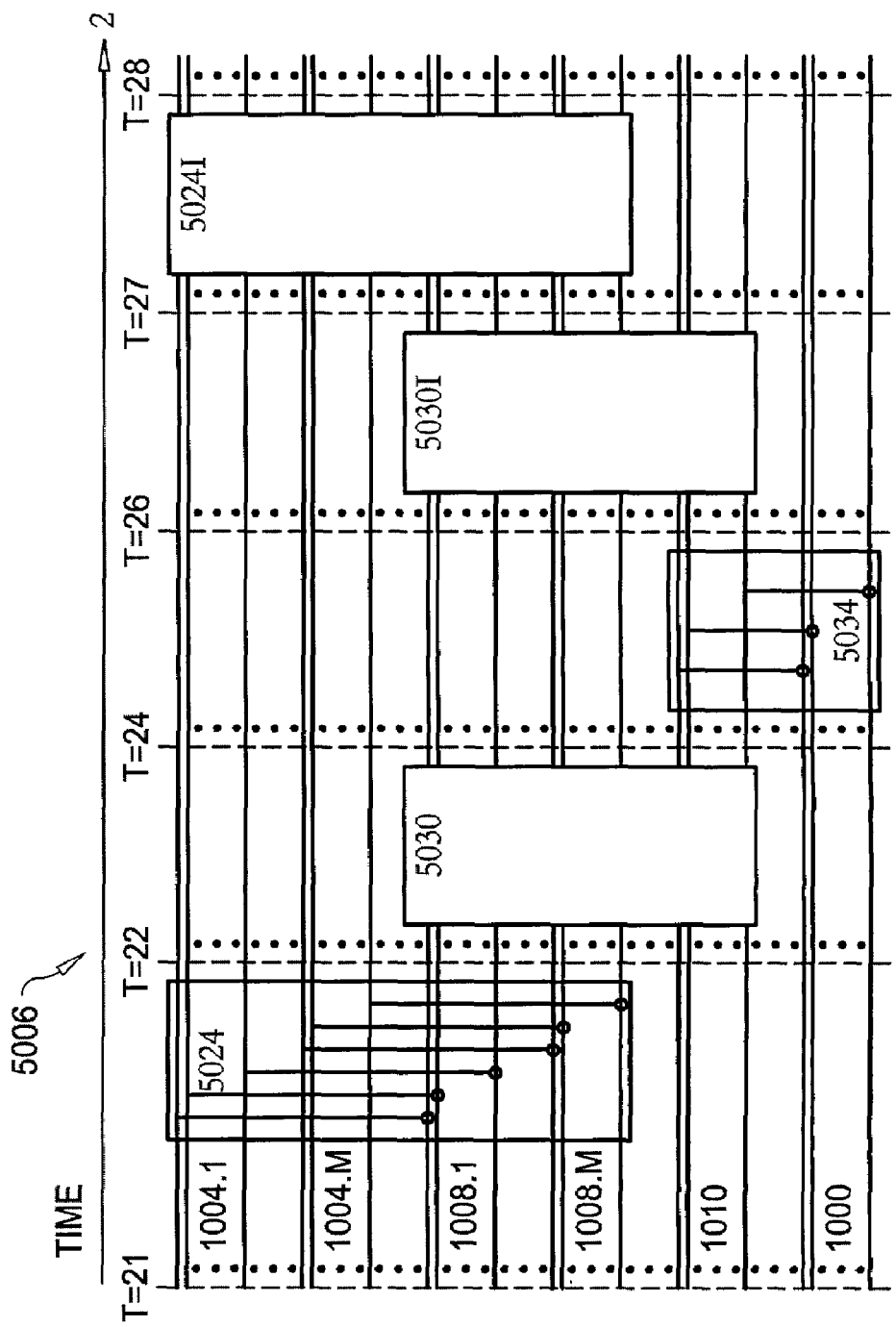
FIG. 4 is an exemplary representation of operations forming element 5006 in FIG. 1, which is the Fourier phase estimator operation.

FIG. 4 shows details of operation 5006 of FIG. 1. FIG. 4 shows times 21, 22, 24, 26, 27,28 and operations 5024, 5030, 5034, 5030I, and 5024I. FIG. 4 shows operations resulting in setting Q1000 from |x> to |0> with high probability. Hereafter, high probability means that the total error probability is small.

Operation 5024 operates on all ancilla qubits of Q1004.$i$ and Q1008.$i$. Initially, at T=21, each of Q10004.1 is in some state |Px>, Q1008.$i$ is prepared in the state |0>, Q1010 is also prepared in the state |0>, whereas Q1000 is in some state |x>. Operation 5024 copies the state of Q1004.$i$ into Q1008.$i$. Operation 5024 simulates the effect of a measurement on the qubits Q1004.$i$.

Q1008 consists of O(n log n) qubits. Q1010 consists of n qubits.

Operation 5030 operates on Q1008.$i$ Q1010 and some additional ancillary qubits (not shown in FIG. 4) to change Q1010 from |0> to |x> with high probability.

Operation 5034 operates on Q1010 and Q1000 to change Q1000 from |x> to |0> with high probability.

Operation 5030I is the inverse operation of operation 5030, it maps the state of Q1010 from |x> to |0>.

Operation 5024I is the inverse operation of operation 5024, it maps the state of Q1008.$i$ back to |0>. Therefore, the overall operation of 5006 in FIG. 4 maps the state of Q10004.$i$ and Q1000 from |Px> |Px>. . . |Px> |x> to |Px> |Px>. . . |Px> |0> with high probability. In other words, the state of Q1000 is erased with high probability.

In operation 5024, each qubit in Q1004$i$ has a measurement simulated by using a controlled NOT gate to XOR the qubit onto a qubit from qubits 1008. Since the qubit has not truly been observed its state remain undisturbed, but entangled with the new qubit. The new qubits are then used to control quantum operations that depend on the value of the observation in the same way that the actual result would be used to control quantum operations. All of the controlled-NOT gates can operate concurrently, so this operation has constant depth. At time 22 the qubits 1008 store entangled copies of the qubits 1004. The entanglement between the qubits and those from which they were copied is such that observation of both qubits would give redundant information. The ancilla qubits extracts the measurement outcome from the qubit, without requiring a measurement. We call this extraction a pseudo measurement. The copying of the ancilla qubits described above is a unitary transformation. Such a unitary description of an operation—the copying operation in the current example—is sometimes called "the Church of the Larger Hilbert space".

Operation 5030 uses the results of these pseudo measurements (i.e., the states of Q1008.$i$) to estimate the phase |x>. It takes as input the qubits 1010 upon which it will store |x> at time 24. Operation 5030 has two parts. The first part of operation 5030 computes an encoded representation of |x>. Many copies are needed so that the probability of error is sufficiently small that we can be relatively sure the estimation of |x> is correct. For each qubit in |Px>, half of the qubits are measured against the basis $$\left\{ \frac{1}{\sqrt{2}}|0\rangle + \frac{1}{\sqrt{2}}|1\rangle, \frac{1}{\sqrt{2}}|0\rangle - \frac{1}{\sqrt{2}}|1\rangle \right\}$$

and the other half are measured against the basis $$\left\{ \frac{1}{\sqrt{2}}|0\rangle + \frac{i}{\sqrt{2}}|1\rangle, \frac{1}{\sqrt{2}}|0\rangle - \frac{i}{\sqrt{2}}|1\rangle \right\}.$$

These two types of measurements can place the qubit into one of four categories. The inventors, in their paper cited herein above, describe why these measurements help categorize |Px>. The first two categories are 0, and 1. These reflect the cases in which the exact value of the qubit can be estimated from the measurement. If this case proves to be uninformative, for instance when half the measurements say 0 and the other half say 1, then a second class of measurement may be used to determine the qubit's value as a function of the next qubit's value. Two possibilities arise, either the qubit is the same as the next qubit, or the qubit is the opposite of the next qubit. The two possibilities are denoted P and N, respectively, for propagate and negate. The estimation process will take the results of the simulated measurement and output an encoded string for the phase in terms of the classes 0,1, P, and N. Because only pseudo measurements are used instead of real measurements, the result of first part of operation 5050 is a superposition over all possible encodings. The weights on each possible encoding correspond exactly to the probability that the encoding would have been generated had there been a measurement of the states of ancilla qubits Q1008i. Because we have used O(log n) copies of the state |Px>, we can effectively reduce the probability of error in this operation to an exponentially small value, and thus the majority of weight in the superposition is on the correct encoding of |x>.

We will now describe the second part of operation 5030. In the second part of the operation 5030, the encoded string, stored in some ancillary qubits not shown in FIG. 4, Is input into a decoder. The second part of the operation 5030 decodes the input, the encoded form of x, to obtain x with high probability. The decoding can be done by a parallel implementation of a matrix multiplication algorithm. The inventors discussed this decoding operation in detail in Cleve and Watrous, Quant-ph/0006004. Parallelization of this decoding algorithm can be done by the parallel prefix method, cited herein above. The output of 5030 is the phase of the Fourier basis state with exponentially small probability of error. Finally, operation 5034 XORs the estimated phase of |x> is stored in Q1010 onto the state stored in qubits Q1000. Operation 5034 alters the values of Q1000 to state |0> with high probability (a probability defined by the number of sets of ancilla Q1004i, Q1008i, involved in 5024 and 5030).

A string of symbols from the set {P, N, 0, 1} is created from the results of the observations, according to operation 5030, and then this string is decoded to approximate the computational basis state, according to operation 5032. Decoding the string is done using parallel prefix method to ensure logarithmic depth.

Operation 5030I is the inverse operation 5030. Operation 5024I is simply the inverse operation 5024. The operations 5030I and 5024I together reset the states of the ancillas Q1008.i Q1010 and other ancillary qubits (employed in operation 5030, but not shown in FIG. 4) all to |0>.

Figure 5:
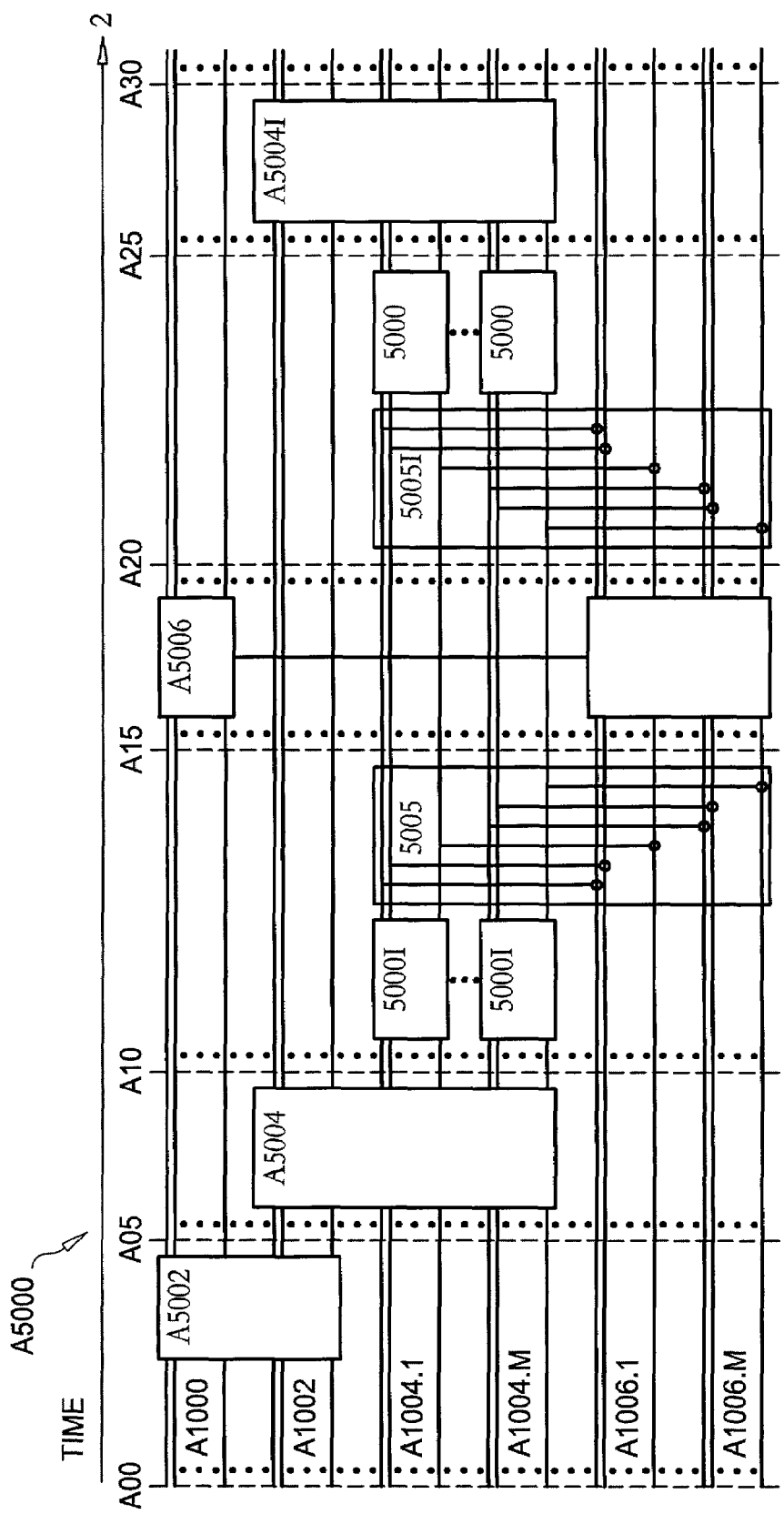
FIG. 5 is a representation of one preferred embodiment of QFT computation for arbitrary modulus.

FIG. 5 shows a method for computing the QFT of a computational basis state of an arbitrary modulus, which is a whole Number that is not necessarily a power of 2. Let n be the integral part of Log m+O (1), where the integral part of log m means the largest integer that is smaller than log m. FIG. 5 shows operation A5000 at times A00, A05, A10, A15, A20, A25, and A30, and sequential operations A5002, A5004, 5000I, 5005, A5006, and sets of qubits A1000, A1002, A1004.i for i=1 to M, and A1006i for i=1 to M. FIG. 5 shows operations providing the QFT for an arbitrary modulus.

At time A00, qubits A1000 are initialized to a computational basis state |x>, A1002, A1004i, AND A1006i for i=1 to M are initialized to |0>.

After time A00, operation A5002 operates on A1000 and A1002, changes A1002 from |0> to |Px>, and leaves all other qubits unchanged.

After time A05, operation A5004 operates on qubits A1002 and A1004i for all i=1 to M, copies |Px> from A1002 to A1004i, and leaves all other qubits unchanged.

Operation 5000I is an inverse of a QFT of modulus $2^n$. After time A10, operation 5000I operates on each A1004i (as explained in the description of FIGS. 1–4). Operations 5000I may be performed concurrently.

After operations 5000I, operation 5005 operates on all A1004i and A1006i, copies the state of each A1004i into a corresponding A1006i, and leaves A1000, A1002, and A1004i unchanged. Operation 5005 simulates the effect of a measurement on A1004.i After time A15, operation A5006 operates on A1000 and A1006i, changes A1000 from |x> to |0> with high probability, and leaves the state of A1006.i unchanged. Mathematically, the operation A5006 maps |x> (F^{dagger}–{$2^n$}|Px>) (F^{dagger}_{$2^n$ |Px>) . . . (F^{dagger}_{$2^n$}|Px>) to |022 (F^{dagger}_{$2^n$ |Px>)(F^{dagger}_{$2^n$}|Px>) . . . (F^{dagger}_{$2^n$} |Px>) with high probability. In summary, operation A5006 estimates the value of x using Registers A1006.i and subtract the estimated value from the register A1000.

After time A20, operation 5005I, the inverse of 5005, operates on all of A1004.i and A1008.i and resets the state of each of A1008.i to |0>. Afterwards, the operation 5000 operates on each of A1004.i, changes the state of Each of A1004.i from (F^{dagger}_{$2^n$} |Px>) to |Px>. Here, the expression F^55 dagger} means the adjoint/inverse operator of F, which is the quantum Fourier Transform operator.

A5004I is the inverse of A5004. After time A25, operation A5004I operates on A1002 and A1004i, changes A1004i to |0> for all i and leaves all other qubits unchanged.

Preferably, A1004 and A1006 contain the same number of qubits, nM, where M is O (log n) and n is the number of qubits in A1000.

A5002 compute the Fourier basis state for modulus m. The depth of the operations A5002 is poly-logarithmic in contrast to the logarithmic depth of 5000.

Operation A5004 is also polylogarithmnic in contrast with the logarithmic depth of operation 5004.

Both operations A5002 and A5004 result states of corresponding qubits as operations 5002 and 5004. At time A05 the Fourier basis state with phase x, |Px> has been computed by A5002 and stored in qubits A1002. At time A10 this Fourier basis state has been copied O(log n) times into qubits A1004.

The major difference between operation 5000 and operation A 5000 is the operation for estimating the phase. In operation A5000, operations 5000 finish the computation of |Px> in A1002.

At time A10 the inverse QFT with modulus $2^n$ for some sufficiently large n, operation 5000I, is performed on each copy of the Fourier basis state stored in qubits 1004. Measurements are simulated on these copies again through the use of controlled NOT gates as in FIG. 5. In A5006, the A1006i are used to compute |ym$2^{(-n)}$+0.5 | mod m for each computational basis state y. The output of the above computation of the integral part of (y m $2^{(-n)}$+0.5) is, with a high probability, equal to x. Therefore, in A5006, such an output can be used to erase |x> stored in A1000. This can be used to erase |x> by XORing A1000 and A1006i together in operation A5006, as shown in the description of 5006 in FIGS. 1–4. At time A30, |Px> is stored in A1002 and A1000 has changed to state |0> with a high probability.

Figure 6:
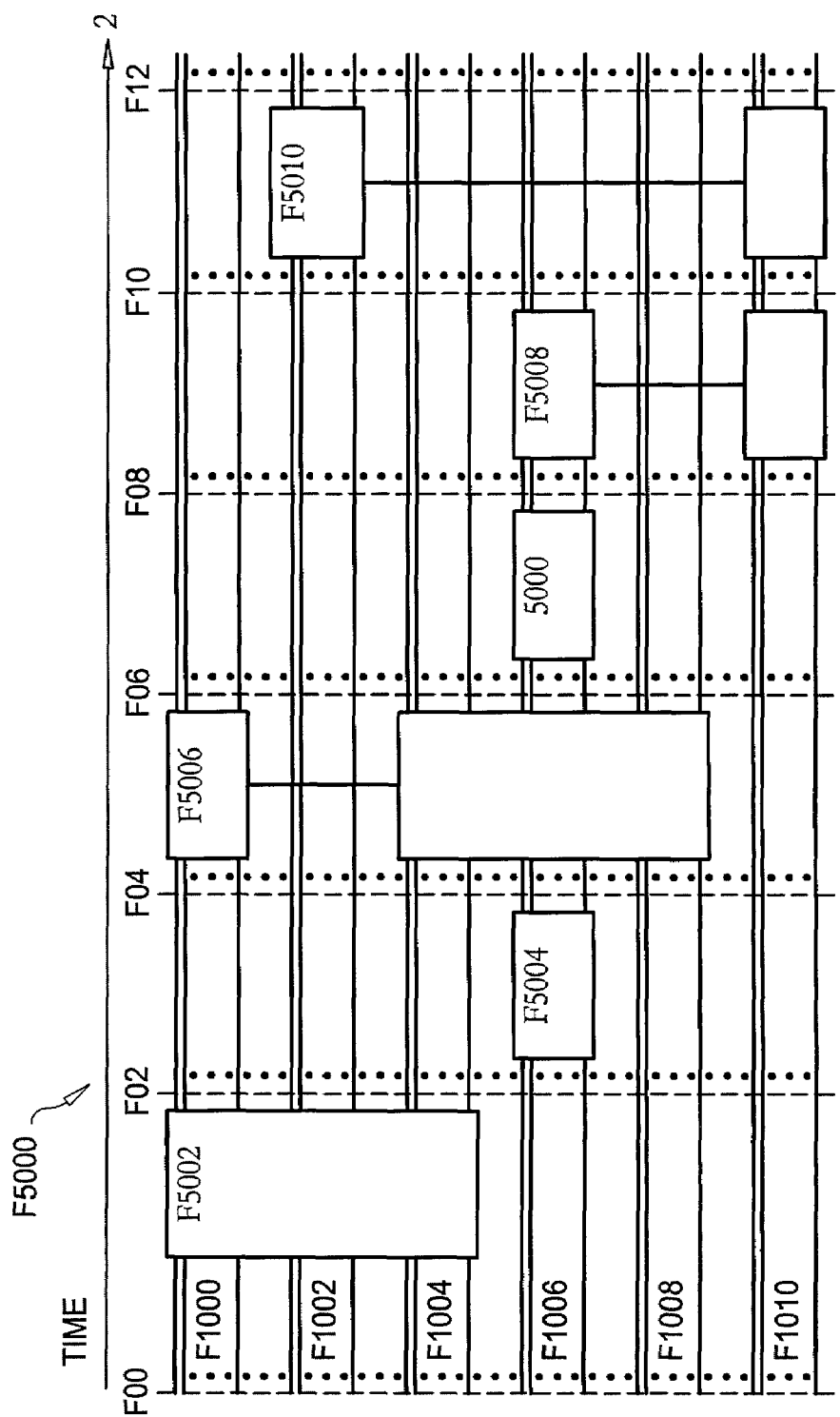
FIG. 6 is a representation of one preferred embodiment of Shor's quantum factoring algorithm with logarithmic depth quantum circuits.

FIG. 6 shows a method F5000 for factoring based on Shor's algorithm. Method F5000 produces a factor of an n-bit composite number, N, with high probability. F5000 includes classical operations performed on classical electronic circuits either digital or analog, and quantum operations on qubits. The quantum operations require only polylogarithmic depth. The classical operations require circuits of polynomial depth.

When qubits are used in classical portions of the operation they are assumed to not be in superposition. That is they will always be in one computational basis state, the same as classical bits. This will be discussed in further detail below.

FIG. 6 shows sequential times F00, F02, F04, F06, F08, F10, and F12, and operations F5002, F5004, F5006, 5000, F5008, and F5010.

Qubit sets F1000, F1002, F1004 each contain n qubits. F1006 preferably contains about 2n qubits; it is of size about 2n. F1008 preferably contains n qubits; it is of size n.

F1006 and F1008 must be qubits. F1000, F1002, F1004, and F1010 maybe qubits or classical bits.

At time equals F00, F1000 are initialize to |N>, the quantum state representing the binary representation of the number, N, which is to be factorized., and all other qubits are initialized to |0>.

After time F00, operation F5002 operates on qubits F1000, F1002, and F1004. Operation F5002 changes F1004 to a random number, "a", in the range 2 to N−1. F5002 then determines whether "a" is a factor of N. IF 5002 determines that a is a factor of N, F5002 also changes F1002 to represent a, |a>. Shor's factoring algorithm has a subroutine on modular exponentiation. The inventors recognized that the modular exponentiation step can be shifted to the classical computation step. While it is not shown explicitly in FIG. 5, it should be understood that such modular exponentiation step can be done in, for example, the time between A00 and A05 by a conventional computer (digital or Analog).

After time F02, quantum operation F5004 operates on qubits F1006 to change F1006 to a uniform superposition over all computational basis states of the 2n qubits. That is to say, up to a normalization constant, the state is given by |0>+|1>+|2>+. . . +|2$^{n-1}$>. Quantum operation F1006 applies one Hadamard gate operation to each qubit in F1006. Quantum operation F1006 has constant depth.

After time F04, quantum operation F5006 operates on qubits F1000, F1004. Operation F5006 is linear. Therefore, to define operation F5006, it is sufficient to define its action on basis states and extend its action to a general state by linearity. For this reason, consider an input state |x> for the qubits in F1006. The state of F1008 is |0>. Operation F5006 keeps the basis state of F1006 unchanged as |x>. Operation F5006 changes the state of F1008 from |0> to |a$^x$ mod N>. In summary, F5006 is specified by the unitary transformation |x>|y> to |x>|y+a$^x$ mod N> where the first register refers to F1006 and the second register refers to F1008.

After time F06, operation 5000 operates on qubits F1006 to define the QFT of F1006.

At time F08, after QFT 5000, the state of F1006 is measured.

After time F08, classical operation F5008 operates on the classical bits prepared as all zeros in F1006, and on the measured values of F1010. F5008 applies a continued fraction algorithm to find integers k and r, where 0 is less than or equal to k which is less than r, such that the following inequality is satisfied:

$$\left| \frac{y}{2^{\wedge}2n} - \frac{k}{r} \right| \leq \frac{1}{2^{\wedge}2n}$$

If α$^r$ mod N is not equal to one then the whole process depicted in FIG. 6 from time F00 should be are repeated. If α$^r$ mod N equals 1, r is stored in qubits F1010.

After time F10, operation F5010 operates on qubits F1002 and F1010. If F1002 is not equal to |0> then no operation is performed.

In operation F5010, if F1002 equals |0>, and r is an odd number, then the whole process depicted in FIG. 6 from time F00 is performed again, using freshly prepared ancilla qubits.

In operation F5010, if F1002 equals |0>, and r is an even number, then operation F5010 computes the greatest divisor of a$^{r/2}$−1 and N. If the greatest divisor is 1 then the whole process depicted in FIG. 6 from time F00 should be repeated. If the greatest divisor is not 1, the greatest divisor is stored in F1002. Qubits F1002 are the n output qubits of operation F5000. The state of Qubits F1002 gives a nontrivial factor of N. The factorization algorithm is now complete. Qubits F1006 and F1008 are the only qubits that need to be quantum bits because they are the only information that are involved in a superposition. Qubits or bits F1010 provide work space for the classical post-processing stage. Qubits F1010 are of size n.

Figure 7:
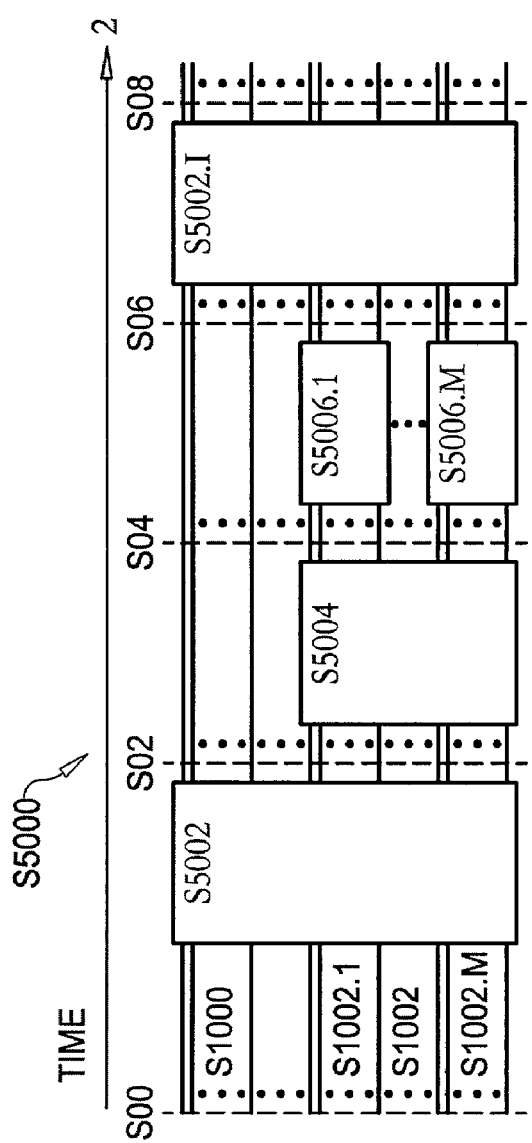
FIG. 7 is a representation of one preferred embodiment of Shor's mixed-radix method for the quantum Fourier transform with logarithmic depth circuits for arbitrary modulus.

FIG. 7 represents a method S5000 for computing the QFT using Shor's mixed-radix operation in logarithmic depth. FIG. 7 shows sequential times S00, S02, S04, S06, and S08, qubit sets S1000, S1002.i . . . S1002.M, and operations S5002, S5004, S5006.i for i=1 to M, and S5002I. S1000 are both the input and the output qubit set of S5000. S5000 has logarithmic depth.

The symbol n represents the input size. The symbol m is the modulus with respect to the QFT. There are at most at most O (n log m/log log m) qubits S1002.

At time S00, the set of n qubits S1000 is initialized to a computational basis state |x>, and each set of n qubits S1002.i is each initialized to |0>.

After time S00, operation S5002 operates on S1000 and S1002i, to change the state of S1002 so that S1002 stores the modular representation of |x>. The modular representation of |x> is defined by the following transformation:

|x>|0,0, . . . , 0> to |0>|x mod m$_1$>,
|x mod m$_2$>, . . . , |x mod $_k$>, where m$_i$ for 1=1 to k are pair wise relatively prime integers in O(log m) such that modulus m=m$_1$ m$_2$ . . . m$_k$. Here, two numbers are called relatively prime if they have no nontrivial common factors. A most basic method for computing this transformation can be concurrently implemented because m is relatively small. Such methods, related to the Chinese Reminder Theorem, are well known. See, for example, E. Bach and J. Shallit, "Algorithmic Number Theory" and references cited therein. Operation S5002 changes the values of qubits S1002 to a modular representation of |x>.

After time S02, operation S5004 operates on qubits S1002. Operation S5002 multiplies each S1002i by an integer, g$_i$. The g$_i$ are defined such that g$_i$=the inverse of (m/m$_i$) mod m$_i$. Here the S5004 may operate concurrently on all sets of S1002i. See, for example, E. Bach and J. Shallit, "Algorithmic Number Theory," MIT Press, 1996, and references cited therein. S5004 changes the values of qubits S1002 to the states:

|x mod m_1)g_1, (x mod m_2)g_2, . . . ,
(x mod m_k)g_k>

Operations S5006.1 to S5006.M are all QFTs of lesser dimension than S5000. At time S04 each block of qubits S1002.i is input into operation S5006.i where operation S5006.i computes the QFT modulus m, in logarithmic depth. These operations can be implemented in a couple of ways. First, they can recurse on the mixed radix operation in which case the operations S5006.i would be replaced with smaller instances of the operation displayed in FIG. 7. Second, they can be the same operation demonstrated in FIG. 5, which computes the QFT in logarithmic depth for any modulus. At time S06, the QFT has been performed on all the blocks S1002.i.

At time S06, operation S5002I is applied to S1000 and all S1002i to construct |Px> from its modular representation, store |Px> in qubits S1002, and change the values of qubits S1002i to |0>.

Figure 8:
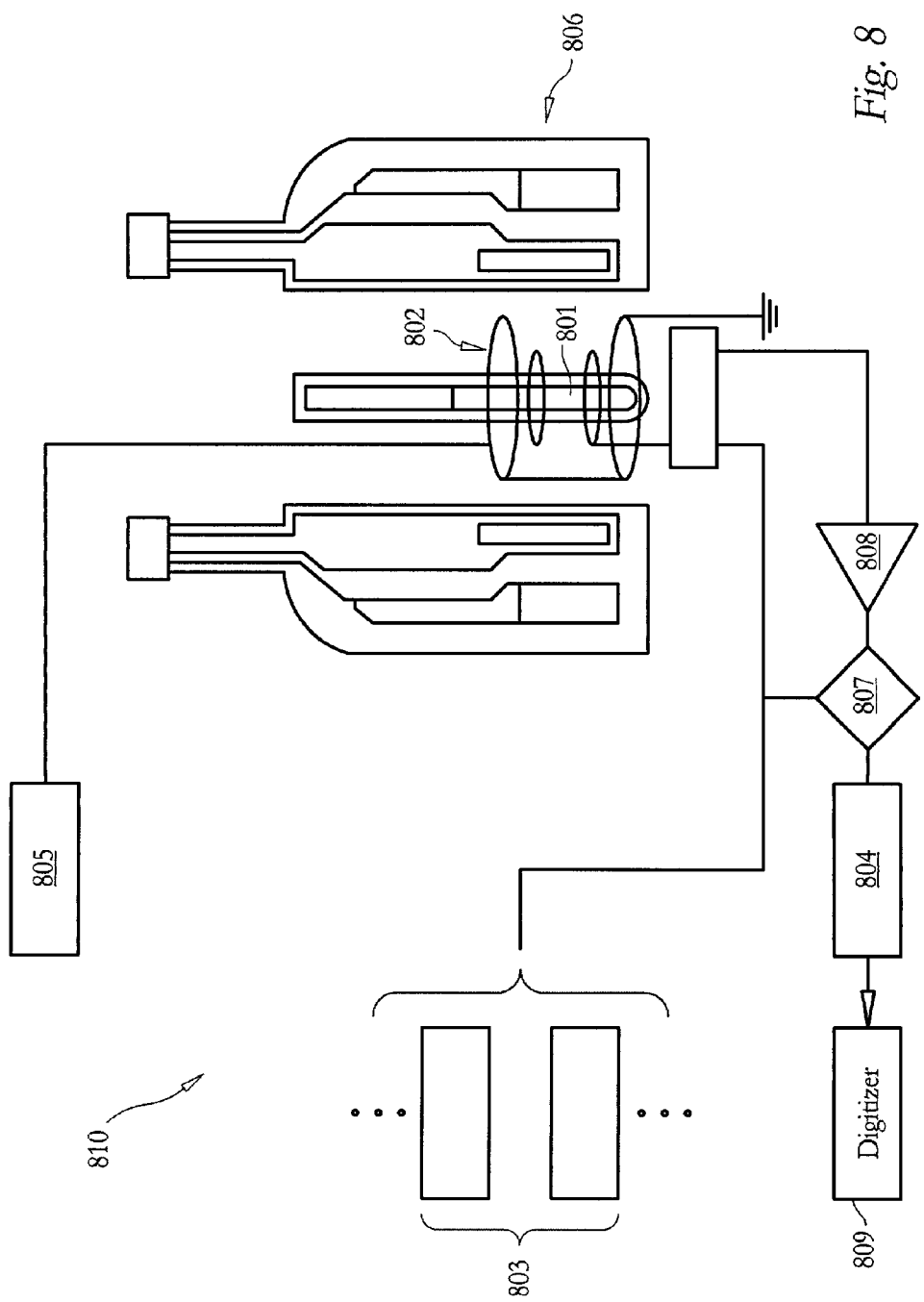
FIG. 8 is a schematic view of a quantum computer.

FIG. 8 schematically illustrates one type of quantum computer, an NMR based quantum computer, for implementing the invention. FIG. 8 shows a quantum computer 810 including a quantum data processing sample 801, an RF cavity 802, a set of RF generators 803, an output signal line 804, a magnetic field gradient current source 805, a dewar and DC magnet 806, a mixer 807, a pre amplifier 808, and a digitizer 809. In operation, the different resonance frequencies of nuclear moments in sample 801 are generated by generators 803. The field gradient 805 may be used to thermodymically couple the sample to the environment to initialize the sample 1 to a thermodynamic ground state. The digitizer 809 digitizes NMR signal output resulting from operations performed on the qubits of the sample 1. Operations are performed by initializing to a ground state, and then exiting the desires qubits/nuclear moments using generators 803 to perform the desired computations.

Combating decoherence may involve using quantum error correcting codes and decoherence free subsystems. The circuits disclosed above generally refer to the transformation on the encoded or logical qubits, rather than the physical qubits. While the above disclosure has been based on the standard quantum circuit model for a parallel quantum computer, the invention applies to different architectures of quantum information processors. Examples of other architectures of quantum information processors include (a) those where only local gates between neighboring qubits are allowed, (b) those where a number of small quantum information processors are networked together by classical or quantum channels and (c) one-way Quantum computers as disclosed in Raussendorf, Browne, and Briegel, http://xxx-.lanl.gov/abs/quant-ph/0108118 and (d) efficient linear optics quantum computation as disclosed in Knill, Laflamme, and Milburn, http://xxx.lanl.gov/abs/quant-ph/0006088. For instance, one can apply standard techniques for transforming circuits from a circuit in a standard parallel quantum computer to a circuit in a quantum computer with only local gates into the circuits disclosed above and in FIG. 1-7 to implement the present invention.

Furthermore, the present invention may be applied to other quantum information units including d-level quantum systems and continuous variables.

While the above specification concerns mainly with the depth of a circuit, the invention may also be useful for obtaining a trade-off between the depth and the size of a circuit. By increasing the depth of circuit, one may achieve A QFT with a smaller number of qubits than what is otherwise necessary or convenient. The invention is also compatible with various simplifications and modifications, which allow a further reduction in the depth and/or the size of a circuit.

The methods illustrated above in connection with FIGS. 1-7 are examples of uses of logarithmic and poly logarithmic gate operations of the invention. The invention has been described above in the context of certain useful algorithms. The scope of the invention is more properly defined by the following claims, and those claims and their equivalents are what the inventors claim as their invention.

We claim:

1. A method of performing a quantum Fourier transform in a quantum computing circuit using input qubits and ancilla qubits each capable of occupying multiple states, comprising:
   forming the quantum computing circuit as a collection of two-qubit gates operating on input qubits;
   interacting the ancilla qubits with the input qubits to cause the ancilla qubits to be transformed to a state corresponding to an output of a discrete Fourier transform of a classical state of the input qubits;
   non-destructively resetting the input qubits to a ground state by physically interacting the input qubits with the ancilla qubits; and
   transforming the ancilla qubits to a state representative of a quantum Fourier transform of the input qubits.

2. The method of claim 1, whereby the quantum circuit has a depth that scales logarithmically as a function of a number of input qubits transformed, and including a number of ancilla qubits that is proportional to the number of input qubits times the depth of the quantum circuit.

3. A method according to claim 1 of factoring an integer using a quantum circuit, comprising:
   performing a classical computation that receives as input the integer as an n-bit binary integer and that produces as output the quantum circuit of claim 1
   implementing Shor's quantum factoring algorithm in the quantum circuit and creating a corresponding output of the quantum circuit; and
   performing classical computation on the quantum circuit output to generate a factorization of the input number.

4. The method of claim 1, including using n input qubits and forming the quantum circuit to have a depth of O(log n).

5. A method of performing a quantum Fourier transform in a quantum computing circuit, comprising:
   forming quantum computing circuit as a collection of two-qubit gates operating on input qubits;
   using ancilla qubits to replicate a state corresponding to an output of a discrete Fourier transform of a classical state of the input qubits; and
   transforming the ancilla qubits to a state representative of a quantum Fourier transform of the input qubits.

6. A quantum computing circuit, comprising:
   a collection of two-qubit gates adapted to operate on a sequence of input qubits;
   a collection of ancilla qubits adapted to physically interact with the input qubits;
   means for physically interacting the input qubits with the input qubits to cause the ancilla qubits to be transformed to a state corresponding to an output of a discrete Fourier transform of a classical state of the input qubits; and
   means for transforming the ancilla qubits to a state representative of a quantum Fourier transform of the sequence of input qubits.

* * * * *